(12) United States Patent
Lu et al.

(10) Patent No.: US 9,188,380 B2
(45) Date of Patent: Nov. 17, 2015

(54) AIRCRAFT GALLEY LIQUID COOLING SYSTEM

(75) Inventors: Qiao Lu, Placentia, CA (US); William Godecker, Irvine, CA (US)

(73) Assignee: B/E AEROSPACE, INC., Wellington, FL (US)

( * ) Notice: Subject to any disclaimer, the term of this patent is extended or adjusted under 35 U.S.C. 154(b) by 573 days.

(21) Appl. No.: 13/215,555

(22) Filed: Aug. 23, 2011

(65) Prior Publication Data
US 2013/0048264 A1    Feb. 28, 2013

(51) Int. Cl.
  *F25D 17/02*   (2006.01)
  *F25D 17/00*   (2006.01)
  (Continued)

(52) U.S. Cl.
  CPC ............... *F25D 17/00* (2013.01); *G05D 23/00* (2013.01); *G05D 23/1932* (2013.01); *B64D 11/04* (2013.01); *B64D 2013/0629* (2013.01); *B64D 2013/0674* (2013.01); *F25B 5/02* (2013.01); *F25B 2313/0272* (2013.01);
  (Continued)

(58) Field of Classification Search
  CPC ............... F25B 2700/2104; F25B 5/02; F25B 2313/02331; F25B 2600/2515; F25B 2313/0272; B64D 2013/0629; B64D 11/04; F25D 17/02
  USPC ....................................... 62/185, 201, DIG. 5
  See application file for complete search history.

(56) References Cited

U.S. PATENT DOCUMENTS 4,273,304 A    6/1981  Frosch et al.
4,409,796 A   10/1983  Fisher
  (Continued)

FOREIGN PATENT DOCUMENTS

JP     57-67771 A    4/1982
JP     57-118116 A   7/1982
  (Continued)

OTHER PUBLICATIONS

Definition of the article "a" from Dictionary.com, Accessed Oct. 2014, Note that irrelevant definitions were excluded from this printout such as those pertaining to Middle English and Old English.*
  (Continued)

*Primary Examiner* — Marc Norman
*Assistant Examiner* — Max Snow
(74) *Attorney, Agent, or Firm* — Drinker Biddle & Reath LLP

(57) ABSTRACT

A storage compartment cooling apparatus includes a liquid circulation system that circulates a liquid coolant, a heat exchanger that cools an interior of a storage compartment using the liquid coolant, a bypass line through which the liquid coolant selectively bypasses the heat exchanger, one or more valves that controllably increase and decrease the flow of the liquid coolant through the heat exchanger and the bypass line, and a controller that controls the one or more valves. A storage compartment cooling system includes a liquid coolant distribution loop that distributes a chilled liquid coolant to a plurality of the storage compartment cooling apparatuses coupled in series and a recirculation cooling device that includes a chiller that chills the liquid coolant to have a temperature lower than an ambient temperature and a circulation unit that circulates the chilled liquid coolant through the liquid coolant distribution loop. A method of controlling the storage compartment cooling system includes reversing a direction of flow of the liquid coolant in the liquid coolant distribution loop.

21 Claims, 12 Drawing Sheets

(51) Int. Cl.
*G05D 23/00* (2006.01)
*G05D 23/19* (2006.01)
*F25B 5/02* (2006.01)
*B64D 11/04* (2006.01)
*B64D 13/06* (2006.01)

(52) U.S. Cl.
CPC .............. *F25B 2313/02331* (2013.01); *F25B 2700/2104* (2013.01); *F25D 17/02* (2013.01)

(56) References Cited

U.S. PATENT DOCUMENTS

| | | | |
|---|---|---|---|
| 4,616,484 A | 10/1986 | Mehdi et al. | |
| 4,620,588 A | 11/1986 | Pfouts et al. | |
| 4,905,893 A | 3/1990 | Kiskis | |
| 5,086,622 A | 2/1992 | Warner | |
| 5,363,668 A * | 11/1994 | Nakao et al. | 62/141 |
| 5,369,960 A | 12/1994 | Mueller et al. | |
| 5,467,745 A | 11/1995 | Hollis | |
| 5,491,979 A | 2/1996 | Kull et al. | |
| 5,513,500 A | 5/1996 | Fischer et al. | |
| 5,553,461 A | 9/1996 | Hitzigrath et al. | |
| 5,664,426 A * | 9/1997 | Lu | 62/93 |
| 5,669,335 A | 9/1997 | Hollis | |
| 5,727,393 A | 3/1998 | Mahmoudzadeh | |
| 5,937,802 A | 8/1999 | Bethel et al. | |
| 6,125,643 A | 10/2000 | Noda et al. | |
| 6,237,357 B1 * | 5/2001 | Hirao et al. | 62/325 |
| 6,269,872 B1 | 8/2001 | Anderson | |
| 6,415,595 B1 | 7/2002 | Wilmot, Jr. et al. | |
| 6,607,142 B1 | 8/2003 | Boggs et al. | |
| 6,845,627 B1 * | 1/2005 | Buck | 62/185 |
| 6,941,764 B2 | 9/2005 | Leroy et al. | |
| 7,007,501 B2 | 3/2006 | Hu | |
| 7,181,921 B2 * | 2/2007 | Nuiding | 62/198 |
| 7,231,778 B2 | 6/2007 | Rigney et al. | |
| 7,434,765 B2 | 10/2008 | Zielinski et al. | |
| 2006/0219360 A1 * | 10/2006 | Iwasaki | 156/345.27 |
| 2007/0084226 A1 | 4/2007 | Simadiris et al. | |
| 2007/0137234 A1 | 6/2007 | Zywiak et al. | |
| 2007/0252039 A1 * | 11/2007 | Wilmot et al. | 244/118.5 |
| 2008/0085672 A1 | 4/2008 | Creed et al. | |
| 2008/0156009 A1 * | 7/2008 | Cur et al. | 62/185 |
| 2008/0196877 A1 | 8/2008 | Zeigler et al. | |
| 2009/0008077 A1 | 1/2009 | Fujii et al. | |
| 2009/0301120 A1 | 12/2009 | Godecker et al. | |
| 2010/0071384 A1 * | 3/2010 | Lu et al. | 62/3.2 |
| 2010/0122805 A1 * | 5/2010 | Yang | 165/164 |
| 2010/0281892 A1 * | 11/2010 | Schroder | 62/89 |
| 2012/0006050 A1 | 1/2012 | Takayama et al. | |

FOREIGN PATENT DOCUMENTS

| | | |
|---|---|---|
| JP | 06-337139 A | 12/1994 |
| JP | 09-196490 A | 7/1997 |
| JP | 09-318295 A | 12/1997 |
| JP | 10-038325 A | 2/1998 |
| JP | 2001-051719 A | 2/2001 |
| JP | 2005-069554 A | 3/2005 |
| JP | 2006-336974 A | 12/2006 |
| JP | 2011-127778 A | 6/2011 |
| WO | 2010113296 A1 | 10/2010 |

OTHER PUBLICATIONS

Office Action issued in related application JP 2014-527301 (with English translation), dated Jul. 14, 2014, 13 pages.

Supplementary European Search Report and written opinion issued in counterpart application EP12826330.8, May 8, 2015, 8 pages.

* cited by examiner

AIRCRAFT GALLEY LIQUID COOLING SYSTEM

BACKGROUND

1. Field

Embodiments generally relate to refrigeration systems, and more particularly to aircraft galley refrigeration systems.

2. Related Art

Aircraft, especially commercial aircraft, typically include galleys equipped with galley refrigeration systems including storage cabinets for items requiring refrigeration, such as food and beverages. The galley refrigeration systems typically include galley refrigeration units, which may also be referred to as storage compartment cooling apparatuses (SCCA's). The SCCA's are typically used in galley or kitchen areas onboard an aircraft to keep items (e.g., food and beverages) cold. A typical SCCA includes a self-contained vapor cycle system configured to provide the cooling functionality of the SCCA. The vapor cycle system typically includes a compressor, condenser, and heat exchanger. Such refrigeration units may be fixed in place in the galley and integrated with the storage compartment, or may be fixed in place in the galley with ducts that removably couple with a galley cart or trolley that holds the storage compartment to be cooled.

The SCCA's are typically configured as line replaceable units (LRU's). In aircraft systems, LRU's are self-contained units (e.g., "black boxes") which may be quickly removed and replaced as a complete unit. By configuring the SCCA's as LRU's, the SCCA's may be easily replaced without extended removal of the aircraft from service or delays of scheduled flights. To facilitate quick and easy removal and replacement, the LRU's typically have a simple interface to other systems onboard the aircraft. For example, a typical SCCA's interface to other systems onboard the aircraft may simply be a connector to the power bus onboard the aircraft.

By being configured as an LRU, each SCCA is a self-contained unit and may operate independently, whether only one SCCA is installed or whether many SCCA's are installed onboard the aircraft. Therefore, components of the SCCA's which may, in principle, be shared, are instead duplicated. This duplication leads to additional weight and space utilization compared to having a single integrated SCCA providing the same functionality but without being configured as a collection of LRU's. Because multiple SCCA's are typically installed in each galley of an aircraft, many duplicate vapor cycle system components are installed as well. This duplication leads to increased weight and space utilization by the collection of installed SCCA's. Due to the relationships between fuel consumption, aircraft weight, maximum payload (e.g., passengers and luggage), and maximum travel distance, it is generally desirable to reduce the weight of components onboard the aircraft. Furthermore, due to the relationship between maximum passenger capacity and revenue generated per flight of the aircraft, it is generally desirable to maximize the space available for revenue generating passenger seats on commercial aircraft, for example by reducing the size (e.g., depth) of components onboard the aircraft.

SUMMARY

In various embodiments, a storage compartment cooling apparatus comprises a liquid circulation system having a first port and a second port, the liquid circulation system configured to circulate a liquid coolant having a temperature lower than an ambient temperature between the first port and the second port; a heat exchanger disposed in the liquid circulation system between the first port and the second port and through which the liquid coolant flows to cool an interior of a storage compartment by transferring heat from the interior of the storage compartment into the liquid coolant; a bypass line disposed in the liquid circulation system in parallel with the heat exchanger and through which liquid coolant selectively flows to bypass the heat exchanger; one or more valves that controllably increase and decrease the flow of the liquid coolant through the heat exchanger and controllably increase and decrease the flow of the liquid coolant through the bypass line; and a controller that controls the one or more valves to increase and decrease the flow of the liquid coolant through the heat exchanger and increase and decrease the flow of the liquid coolant through the bypass line.

In various embodiments, a storage compartment cooling system comprises a liquid coolant distribution loop that distributes a chilled liquid coolant to a plurality of cooling apparatuses coupled in series with the liquid coolant distribution loop; a recirculation cooling device including a chiller that chills the liquid coolant to have a temperature lower than an ambient temperature and a circulation unit that circulates the chilled liquid coolant through the liquid coolant distribution loop; and a plurality of storage compartment cooling apparatuses coupled in series with the liquid coolant distribution loop. Each of the plurality of storage compartment cooling apparatuses includes a liquid circulation system having a first port and a second port, each of the first port and second port in fluid communication with the liquid coolant distribution loop such that one of the first and second ports receives the liquid coolant from the liquid coolant distribution loop and the other of the first and second ports returns the liquid coolant to the liquid coolant distribution loop, the liquid circulation system configured to circulate the liquid coolant between the first port and the second port; a heat exchanger disposed in the liquid circulation system between the first port and the second port and through which the liquid coolant flows to cool an interior of a storage compartment by transferring heat from the interior of the storage compartment into the liquid coolant; a bypass line disposed in the liquid circulation system in parallel with the heat exchanger and through which liquid coolant selectively flows to bypass the heat exchanger; one or more valves that controllably increase and decrease the flow of the liquid coolant through the heat exchanger and controllably increase and decrease the flow of the liquid coolant through the bypass line; and a controller that controls the one or more valves to increase and decrease the flow of the liquid coolant through the heat exchanger and increase and decrease the flow of the liquid coolant through the bypass line.

Various embodiments include a method of controlling a storage compartment cooling system comprising a liquid coolant distribution loop that distributes a chilled liquid coolant to a plurality of cooling apparatuses coupled in series with the liquid coolant distribution loop. The method comprises chilling the liquid coolant to a set temperature below an ambient temperature using a heat exchanger; circulating the chilled liquid coolant among a plurality of cooling apparatuses in a serial liquid coolant distribution loop in a forward flow direction; determining whether the flow direction of the liquid coolant in the liquid coolant distribution loop should be reversed; and reversing the flow direction of the liquid coolant in the liquid coolant distribution loop from the forward flow direction to a reverse flow direction using a reversible flow unit when the determination is made to reverse the flow direction.

DETAILED DESCRIPTION

Aircraft have recently included a liquid cooling system (LCS) to provide a centralized refrigeration system in which chilled coolant is distributed from a central location throughout the aircraft for use in providing cooling to plenums within galleys into which food trolleys/carts are configured, as well as in providing cooling to in-flight entertainment electronics. The LCS typically includes a central refrigeration unit, a pump, and a liquid coolant distribution loop for circulating a chilled liquid coolant (e.g., PGW, a solution of 60% propylene glycol and water by volume, or GALDEN® coolant, etc.). The chilled liquid coolant may be maintained at a chilled temperature by the LCS, such as −8 degrees C. The chilled liquid coolant is typically pumped throughout the aircraft to all galleys and their respective food service trolleys after being chilled by the central refrigeration unit.

Figure 1:
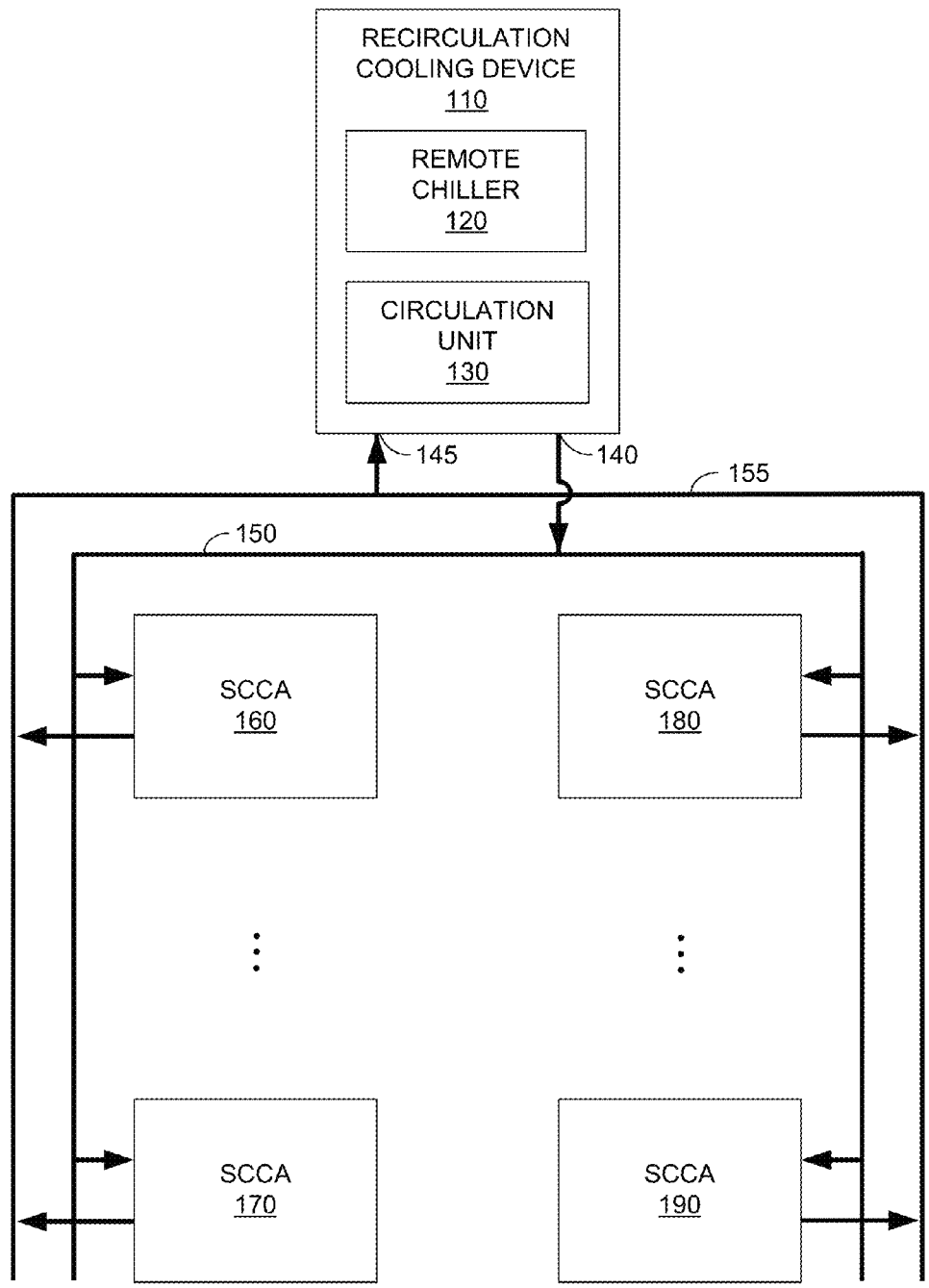
FIG. 1 illustrates a galley refrigeration system for an aircraft including a central liquid cooling system (LCS) having a recirculation cooling device that cools and circulates liquid coolant among a plurality of refrigerators and/or storage cart cooling apparatuses (SCCA's) in a liquid coolant distribution tree in a parallel distribution arrangement, according to an embodiment.

FIG. 1 illustrates a galley refrigeration system for an aircraft including an LCS having a recirculation cooling device 110 that chills and circulates liquid coolant in a liquid coolant distribution tree among a plurality of refrigerators and/or storage cart cooling apparatuses (SCCA's) 160, 170, 180, and 190 in a parallel distribution arrangement, according to an embodiment. While only four SCCA's 160, 170, 180, and 190 are shown, in various embodiments, more or fewer SCCA's may be present and coupled with the LCS. In addition, cooling systems for in-flight entertainment electronics, cabin air conditioning, and other systems onboard the aircraft may also be coupled with the LCS. The recirculation cooling device 110 may include a remote chiller 120 and a circulation unit 130. While only one recirculation cooling device 110 having one remote chiller 120 and one circulation unit 130 is illustrated, in other embodiments there may be more than one recirculation cooling device 110, remote chiller 120, and/or circulation unit 130 disposed within the LCS. In addition, the functionality of the recirculation cooling device 110 may be provided by one or more separate and distinct devices coupled with the LCS, such as separate LRU's.

In some embodiments, the remote chiller 120 may include a vapor cycle system to chill liquid coolant that flows through the LCS. An example of a remote chiller having a vapor cycle system is described in U.S. Pat. No. 6,845,627 entitled "Control System for an Aircraft Galley Cooler" granted to Gilbert W. Buck on Jan. 25, 2005, which is incorporated herein in its entirety by reference. In other embodiments, the remote chiller 120 may include a mechanism including a heat exchanger for chilling the liquid coolant using ambient temperature of the atmosphere outside the aircraft when the aircraft is above a threshold altitude, such as approximately 16,000 feet. The recirculation cooling device 110 may be located away from the galleys onboard the aircraft. Because the recirculation cooling device 110 performs the function of chilling liquid coolant or refrigerant for all SCCA's onboard the aircraft which are coupled with the LCS, SCCA's which are designed to utilize the LCS may not need to include dedicated vapor cycle systems. Instead, the SCCA's may use the liquid coolant provided by the recirculation cooling device 110 to generate cool air to cool their respective storage compartments. Consequently, weight and space utilization of embodiments of the SCCA's described herein may be reduced compared to an SCCA of the prior art which includes a self-contained vapor cycle system.

The circulation unit 130 may include a reservoir of liquid coolant and a pump that pumps the liquid coolant through coolant tubing or ducts of the aircraft to the SCCA's 160-190. In the parallel distribution arrangement shown in FIG. 1, the recirculation cooling device 110 outputs chilled liquid coolant from an output port 140 to a liquid coolant distribution tree 150 which then circulates to the plurality of SCCA's 160-190 in parallel with one another. After the SCCA's 160-190 use the chilled liquid coolant to cool their respective storage compartments, the liquid coolant is elevated in temperature to some degree due to the transfer of heat from the storage compartments. The SCCA's 160-190 then return the warmed liquid coolant to the circulation cooling device 110 via liquid coolant return tree 155 in parallel with one another. The recirculation cooling device 110 then chills the returned liquid coolant once again for redistribution to the SCCA's 160-190. This process repeats in an continuous loop as long as the recirculation cooling device 110 is operating.

A benefit of the arrangement of the SCCA's 160-190 in parallel with one another for receiving and returning the liquid coolant in the LCS is that each SCCA 160-190 receives chilled liquid coolant from the recirculation cooling device 110 at approximately the same temperature. Thus, each of the SCCA's 160-190 may as easily maintain a same low temperature within a respective storage compartment as the others. Also, each of the SCCA's 160-190 may draw a different amount of liquid coolant from the liquid coolant distribution tree 150 without being concerned about how much liquid coolant each of the other SCCA's 160-190 may need to draw. In addition, if one SCCA 160-190 is defective or otherwise must be deactivated or removed from operation, there is no impact on the circulation of the chilled liquid coolant among the other SCCA's 160-190. However, there is a disadvantage to the in-parallel distribution arrangement illustrated in FIG. 1, in that each SCCA 160-190 is coupled with the LCS via two independent lines of tubing or ducts: liquid coolant distribution tree 150 and liquid coolant return tree 155. This double routing of tubing or ducts adds weight and complexity to the LCS, which leads to higher total life cycle ownership costs of the LCS on the aircraft.

Figure 2:
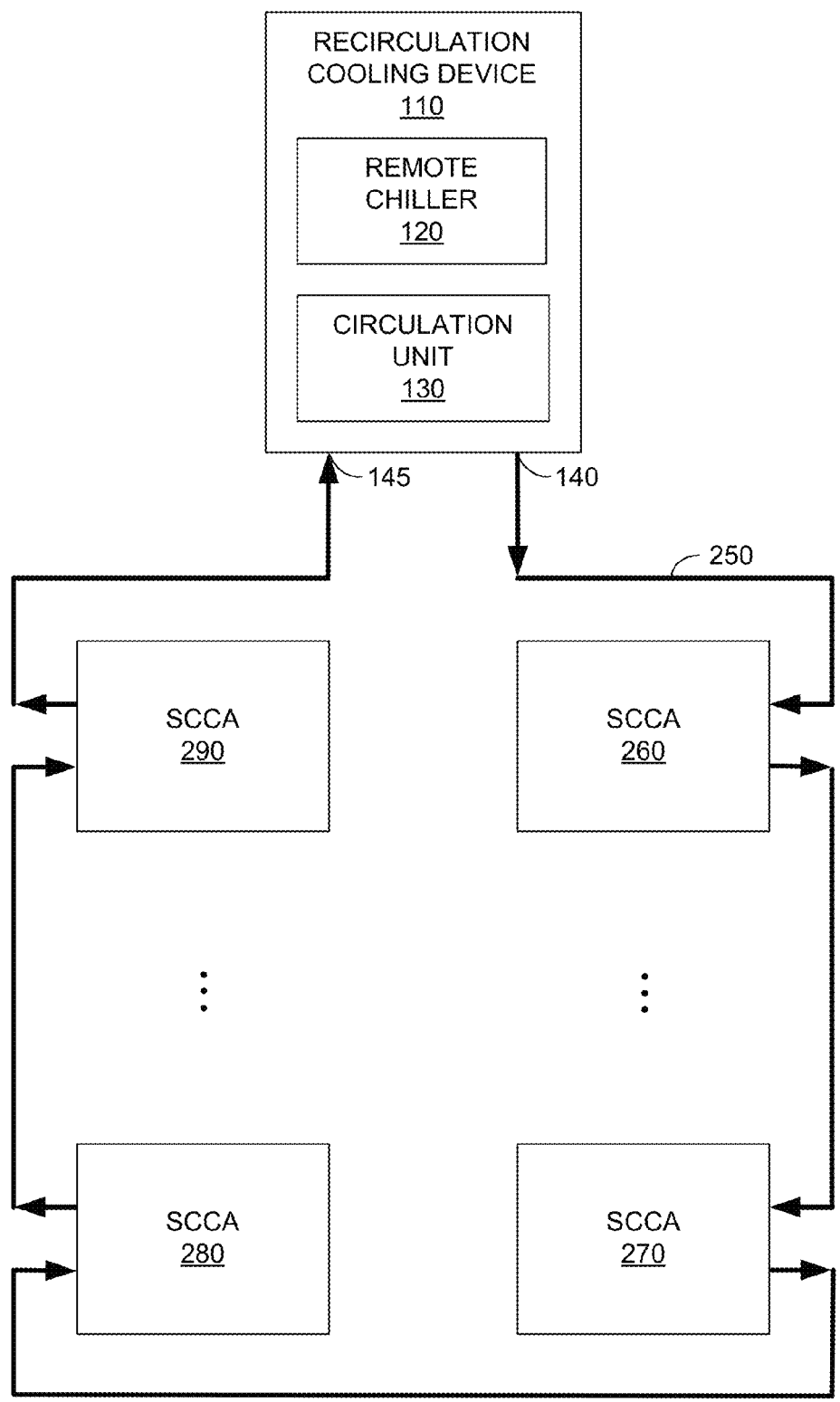
FIG. 2 illustrates a galley refrigeration system for an aircraft including an LCS having a recirculation cooling device that cools and circulates liquid coolant in a liquid coolant distribution loop among a plurality of refrigerators and/or SCCA's in a serial distribution arrangement, according to an embodiment.

FIG. 2 illustrates a galley refrigeration system for an aircraft including an LCS having a recirculation cooling device 110 that cools and circulates liquid coolant in a liquid coolant distribution loop among a plurality of refrigerators and/or SCCA's 260-290 in a serial distribution arrangement, according to an embodiment. The SCCA's 260-290 may be similar to the SCCA's 160-190 of FIG. 1, except that the SCCA's 260-290 may be configured to operate in a serial distribution LCS, whereas the SCCA's 160-190 may be configured to operate in a parallel distribution LCS. As illustrated in FIG. 2, the recirculation cooling device 110 outputs chilled liquid coolant through output port 140 to the SCCA's 260-290 in series via liquid coolant distribution loop 250. After the liquid coolant flows through all the SCCA's 260-290 in series via liquid coolant distribution loop 250, the warmed liquid coolant returns to the recirculation cooling device 110 to be chilled and redistributed to the SCCA's 260-290 again. This process repeats in an continuous loop as long as the recirculation cooling device 110 is operating.

After each of the SCCA's 260-290 use the chilled liquid coolant to cool their respective storage compartments, the liquid coolant is elevated in temperature to some degree. Thus, the liquid coolant received by the SCCA 260 will be at a lower temperature than the liquid coolant received by the SCCA 290 as illustrated in FIG. 2. Therefore, the SCCA 260 may be able to cool a respective storage compartment more efficiently or to a lower temperature than the SCCA 290. This disparity can lead to a failure of the last SCCA(s) within a serial arrangement of SCCA's in the LCS of FIG. 2 to maintain temperatures within the associated storage compartment at specified operating temperatures. As a result, food and beverages stored within the last SCCA(s) may spoil or passengers consuming the food and beverages may be dissatisfied because of their unacceptably high temperature.

Figure 3:
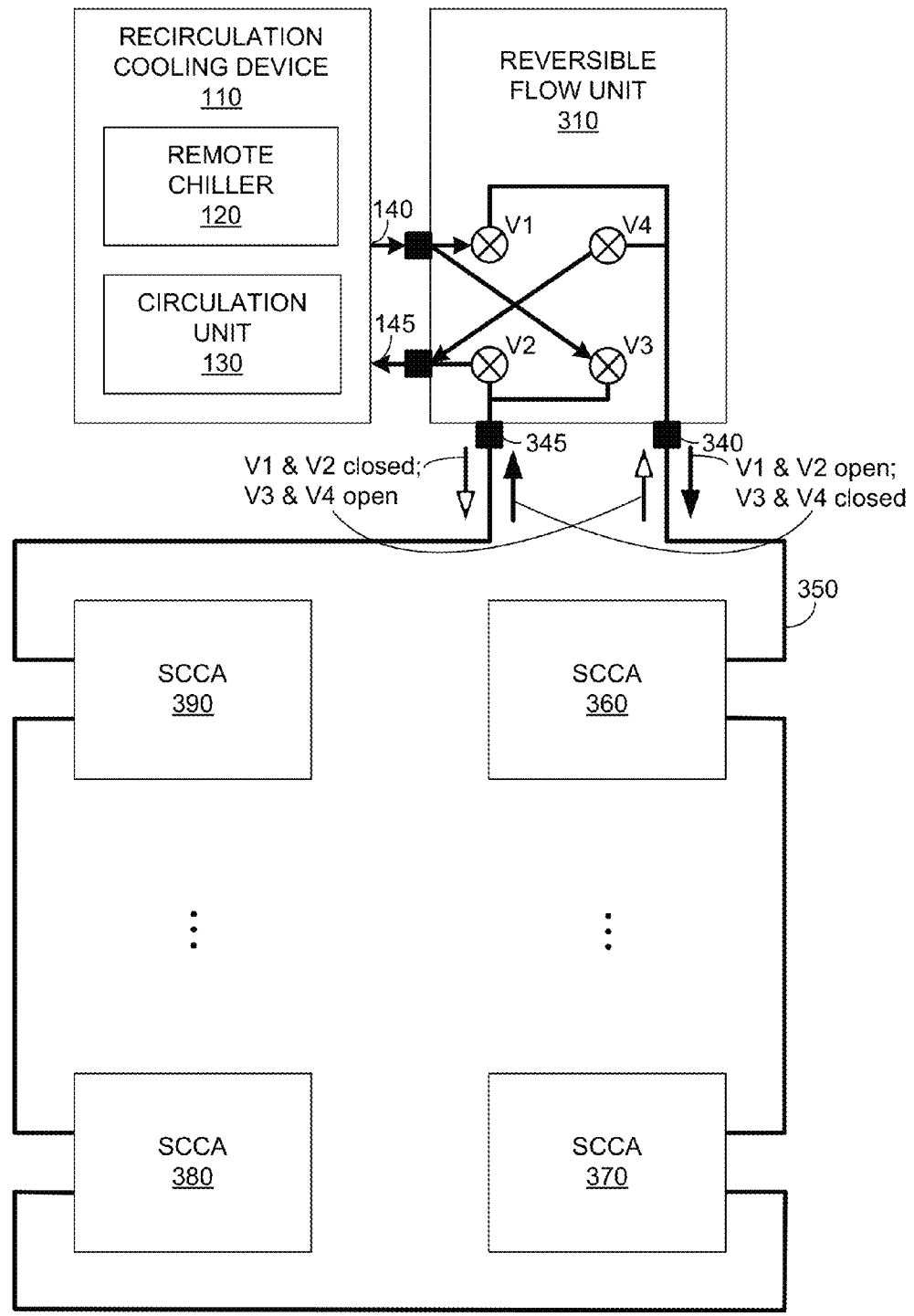
FIG. 3 illustrates a galley refrigeration system for an aircraft including an LCS having a recirculation cooling device that cools and circulates liquid coolant in a liquid coolant distribution loop among a plurality of refrigerators and/or SCCA's in a reversible-direction serial distribution arrangement, according to an embodiment.

FIG. 3 illustrates a galley refrigeration system for an aircraft including an LCS having a recirculation cooling device 110 that cools and circulates liquid coolant in a liquid coolant distribution loop among a plurality of refrigerators and/or SCCA's 360-390 in a reversible-direction serial distribution arrangement, according to an embodiment. To overcome the problems of the single-direction serial distribution LCS illustrated in FIG. 2, the LCS of FIG. 3 includes a reversible flow unit 310. The reversible flow unit 310 receives chilled liquid coolant from the recirculation cooling device 110 via port 140, and outputs warmed liquid coolant to the recirculation cooling device 110 via port 145 to be chilled again and recirculated. The reversible flow unit 310 is configured with four valves V1, V2, V3, and V4 and associated plumbing to reverse a flow direction of the chilled liquid coolant from the recirculation cooling device 110 to the SCCA's 360-390. In various embodiments, other mechanisms as known in the art may be utilized to reverse the flow direction of the chilled liquid coolant in the reversible flow unit 310. The reversible flow unit 310 may operate in one of two opposite flow directions depending upon a control input from a controller having a processor, a local control input from a user, or a manual setting. The reversible flow unit 310 may then switch directions on demand according to the control input or manual setting. Because the direction of flow of the liquid coolant reverses in the LCS of FIG. 3, the SCCA's 360-390 may be specially configured to function well regardless of which direction the liquid coolant may flow within.

For example, in one setting, the reversible flow unit 310 may cause the chilled liquid coolant from the output port 140 of the recirculation cooling device 110 to be distributed among the SCCA's 360-390 in series via a liquid coolant distribution loop 350 in order from the SCCA 360 to the SCCA 370 to the SCCA 380 and to the SCCA 390, after which the liquid coolant is returned to the input port 145 of the recirculation cooling device 110 via the reversible flow unit 310 to be chilled and recirculated again. In this setting, valves V1 and V2 may be open, while valves V3 and V4 are closed. Thus, chilled liquid coolant flows from the output port 140 of the recirculation cooling device 110 through valve V1 to port 340 of the reversible flow unit 310, and then to the SCCA 360 via the liquid coolant distribution loop 350. Warmed liquid coolant then flows from the SCCA 390 into port 345 of the reversible flow unit 310 via the liquid coolant distribution loop 350, through valve V2, and then back to the recirculation cooling device 110 via input port 145 to be chilled and recirculated again.

In an opposite setting, the reversible flow unit 310 may cause the chilled liquid coolant from the output port 140 of the recirculation cooling device 110 to be distributed among the SCCA's 360-390 in series via the liquid coolant distribution loop 350 in reverse order from the SCCA 390 to the SCCA 380 to the SCCA 370 and to the SCCA 360, after which the liquid coolant is returned to the input port 145 of the recirculation cooling device 110 via the reversible flow unit 310 to be chilled and recirculated again. In this setting, valves V1 and V2 may be closed, while valves V3 and V4 are open. Thus, chilled liquid coolant flows from the output port 140 of the recirculation cooling device 110 through valve V3 to port 345 of the reversible flow unit 310, and then to the SCCA 390 via the liquid coolant distribution loop 350. Warmed liquid coolant then flows from the SCCA 360 into port 340 of the reversible flow unit 310 via the liquid coolant distribution loop 350, through valve V4, and then back to the recirculation cooling device 110 via input port 145 to be chilled and recirculated again.

To the extent that the SCCA's 160-190 and SCCA's 260-290 of FIGS. 1 and 2 are specially configured to operate only in either the parallel or serial distribution LCS, respectively, they may not be able to be used on aircraft which use the opposite type of LCS arrangement. This limitation creates a need for aircraft carriers and operators to maintain a supply of spare SCCA LRU's for each type of LCS arrangement, which increases required storage space and costs. Therefore, there is a need for a single SCCA which can be used in conjunction with both an in-parallel and an in-series LCS arrangement. In addition, it is desirable for such an SCCA to be usable in a reversible flow LCS such as that illustrated in FIG. 3. Such SCCA's are described with reference to FIGS. 4-12 herein.

Figure 4:
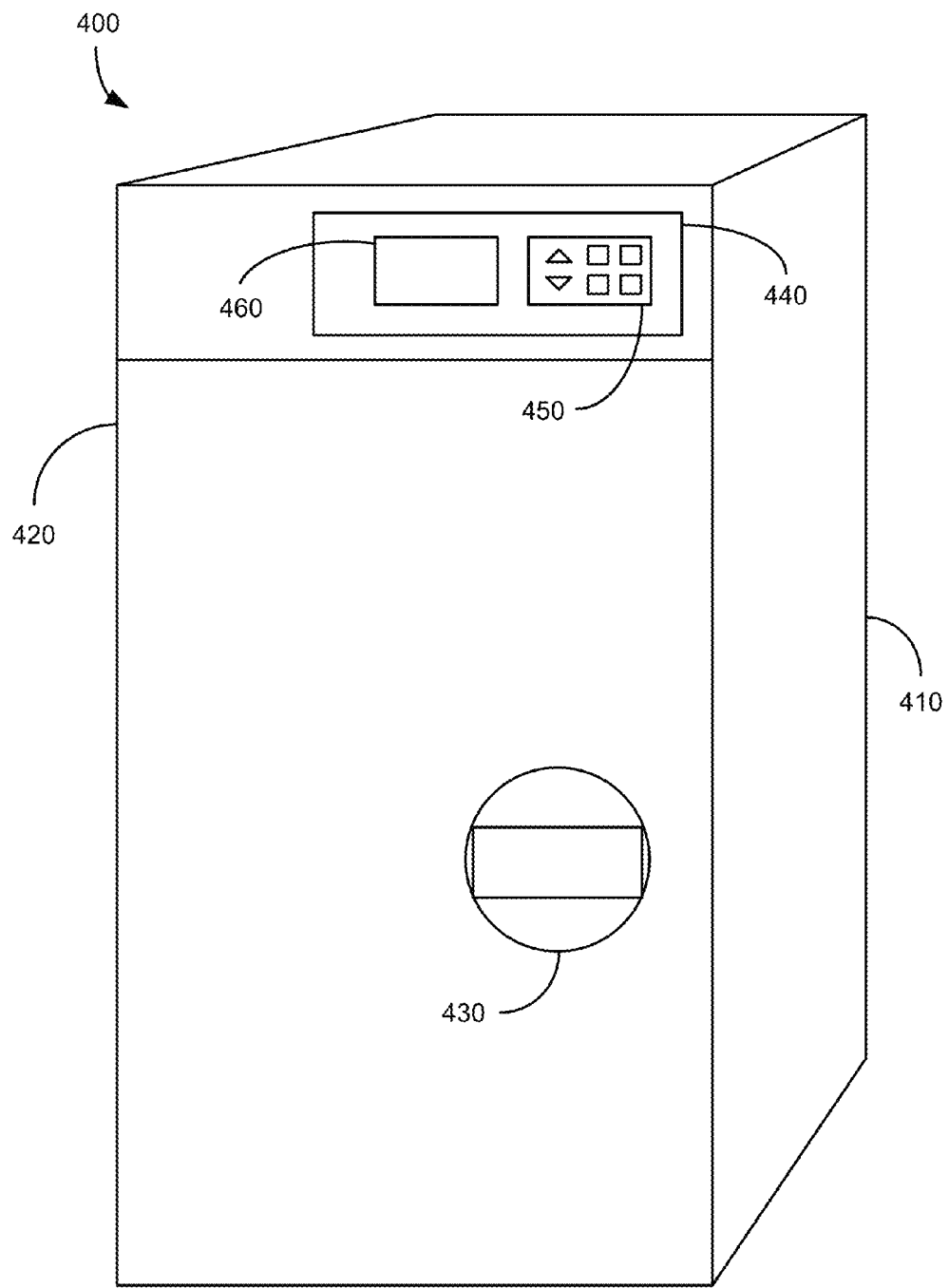
FIG. 4 illustrates a perspective view of an aircraft galley refrigerator, according to an embodiment.

FIG. 4 illustrates a perspective view of an aircraft galley refrigerator 400, according to an embodiment. An embodiment of the refrigerator may be coupled with the LCS of FIG. 1, 2, or 3 as one of the SCCA's 160-190, 260-290, or 360-390. The exemplary aircraft galley refrigerator 400 may be a line replaceable unit (LRU), and may provide refrigeration functionality while the aircraft is both on the ground and in flight.

The refrigeration may be provided using a cooling system that may include a chilled liquid coolant system, a vapor cycle system, and/or a thermoelectric cooling system. The refrigerator 400 may be designed according to an ARINC 810 standard (see ARINC Specification 810-2 "Definition of Standard Interfaces for Galley Insert (GAIN) Equipment, Physical Interfaces," available from ARINC Inc., 2551 Riva Road, Annapolis, Md., 21401, http://www.arinc.com). The refrigerator 400 may be configured to operate using an electrical power source such as three phase 115 or 200 volts alternating current (VAC) at a frequency of 360 to 900 Hz. The refrigerator 100 may employ AC to DC power conversion to provide a predictable and consistent power source to a fan motor and/or valve actuators. The refrigerator 400 may also include a polyphase transformer (e.g., a 15-pulse transformer) to reduce current harmonics reflected from the refrigerator 400 back into an airframe power distribution system with which the refrigerator 400 may be coupled.

A galley refrigerator 400 that connects to the LCS of FIG. 1, 2, or 3 would be beneficial over prior galley refrigerators having their own dedicated cooling systems. Such a new refrigerator 400 may have a lighter weight, have fewer internal parts, use less electrical energy, and be able to hold more contents due to the elimination of the vapor cycle system (or a substantial portion thereof) compared to the prior art. As a result, the galley refrigerator 400 that connects to the LCS may have higher reliability and a reduced cost of ownership. In an embodiment of the refrigerator 400 that connects to the LCS and which does not include a self-contained vapor cycle system, there may not be a requirement for air flow around a condenser. Accordingly, air ducts may not be necessary to install in the galley for ejection of heat from the refrigerator 400.

The refrigerator 400 includes an enclosure 410 (e.g., a chassis) having a door to a refrigerated compartment 420. The refrigerated compartment 420 may include an inner liner and thermal insulation. The inner liner may be constructed of stainless steel. The inner liner and/or the enclosure 410 may be grounded to provide a Faraday shield to help shield the refrigerator 400 from external electromagnetic interference (EMI) influences while containing internally generated high-frequency energy. Various embodiments of the refrigerator 400 may also include an EMI filter to reduce susceptibility to conducted EMI and emissions of EMI. The enclosure 410 may also include mounting rails, a removable air filter, a bezel, and wheels. The door to the refrigerated compartment 420 may include a door handle 430 with which the door may be opened or closed.

The refrigerator 400 may also include a control panel 440 having one or more input devices (e.g., control buttons or switches) 450, and a display panel (e.g., an LCD display or LED's) 460. The display panel 460 may provide a user interface display. The display panel 460 may be mounted on a grounded backplane to reduce RF emissions. An Indium Tin Oxide (ITO) on-polymer layer may be employed behind a display glass of the display panel 460 to block or reduce RF energy radiation. The refrigerator 400 may also include a controller coupled with the input devices 450 and the display panel 460. The controller may receive input commands from a user via the input devices 450, such as turning the refrigerator on or off, selecting an operation mode, and setting a desired temperature of the refrigerated compartment 420. The controller may output information to the user regarding an operational status (e.g., operational mode, activation of a defrost cycle, shut-off due to over-temperature conditions of the refrigerated compartment 420 and/or components of the refrigerator, etc.) of the refrigerator using the display panel 460. The controller may be coupled with the input devices 450 and the display panel 460 using shielded and twisted cables, and may communicate with the input devices 450 and/or the display panel 460 using an RS-232 communication protocol due to its electrically robust characteristics.

The controller of the refrigerator 400 may include an electronic circuit, printed circuit board, computing processor, memory comprising computing instructions, and/or data communications circuitry. The controller may be configured on or with an aluminum chassis or sheet metal box, which may be grounded and largely opaque to high-frequency energy transmission. Wires which carry high voltage and/or high frequency signals into or out of the refrigerator 400 may be twisted and/or shielded to reduce RF radiation, susceptibility, and EMI. Low frequency and low-voltage carrying wires may typically be filtered at the printed circuit board of the controller to bypass any high-frequency noise to ground.

The controller of the refrigerator 400 may be controlled by or communicate with a centralized computing system, such as one onboard an aircraft. The controller may implement a compliant ARINC 812 logical communication interface on a compliant ARINC 810 physical interface. The controller may communicate via a Galley Data Bus (e.g., galley networked GAN bus), and exchange data with a Galley Network Controller (e.g., Master GAIN Control Unit as described in the ARINC 812 specification). In accordance with the ARINC 812 specification, the controller may provide network monitoring, power control, remote operation, failure monitoring, and data transfer functions. (See ARINC Specification 812-1 "Definition of Standard Data Interfaces For Galley Insert (GAIN) Equipment, CAN Communication," available from ARINC Inc., 2551 Riva Road, Annapolis, Md., 21401, http://www.arinc.com.) The controller may implement menu definitions requests received from the Galley Network Controller (GNC) for presentation on a GNC touch panel display device and process associated button push events to respond appropriately. The controller may provide additional communications using an RS-232 communications interface and/or an infrared data port, such as communications with a personal computer (PC) or a personal digital assistant (PDA). Such additional communications may include real-time monitoring of operations of the refrigerator 400, long-term data retrieval, and control system software upgrades. In addition, a serial peripheral interface (SPI) bus may be used to communicate between the controller and motor controllers within the refrigerator 400.

The refrigerator 400 may be configured to refrigerate beverages and/or food products which are placed in the refrigerated compartment 420. The refrigerator 400 may operate in one or more of several modes, including refrigeration, beverage chilling, and freezing. A user may select a desired temperature for the refrigerated compartment 420 using the control panel 440. The controller included with the refrigerator 400 may control a temperature within the refrigerated compartment 420 at a high level of precision according to the desired temperature. Therefore, quality of food stored within the refrigerated compartment 420 may be maintained according to the user-selected operational mode of the refrigerator 400.

In various embodiments, the refrigerator 400 may maintain a temperature inside the refrigerated compartment 420 according to a user-selectable option among several preprogrammed temperatures, or according to a specific user-input temperature. For example, a beverage chiller mode may maintain the temperature inside the refrigerated compartment 420 at a user-selectable temperature of approximately 9 degrees C., 12 degrees C., or 16 degrees C. In a refrigerator mode, the temperature inside the refrigerated compartment 420 may be maintained at a user-selectable temperature of approximately 4 degrees C. or 7 degrees C. In a freezer mode, the temperature inside the refrigerated compartment 420 may be maintained at a user-selectable temperature of approximately ~18 degrees C. to 0 degrees C. In a freezer mode, the refrigerator 400 may also utilize a vapor cycle system, thermoelectric device, or other cooling system in addition to or instead of a heat exchanger coupled with the liquid cooling system of the aircraft.

In various embodiments, the refrigerator 400 may also include a fan assembly, which may have a fan motor, a motor controller, a blower assembly, and an over-temperature thermostat. The fan assembly may be operationally coupled with a heat exchanger, evaporator, and/or condenser. The refrigerator 400 may also include a plumbing system, which may have a liquid-to-air (e.g., forced convection) heat exchanger or a liquid conduction heat exchanger, a pressure vessel, a temperature control valve, a pressure relief burst disc, a temperature sensor, and one or more quick disconnects. In addition, the refrigerator 400 may include a power module having one or more printed circuit boards (PCB's), a wire harness, an ARINC connector, and/or a power conversion unit. The refrigerator 400 may also include ductwork and air interface components, and condensate drainage components.

The refrigerator 400 may also include one or more sensors such as temperature sensors and actuators. The sensors may be configured for air and refrigerant temperature sensing and pressure sensing, while the actuators may be configured for opening and closing valves. For example, an "RT1" evaporator inlet air temperature sensor may measure the temperature of air returning from the refrigerated compartment 420 to an evaporator of a vapor cycle refrigeration system, an "RT2" evaporator outlet air temperature sensor may measure the temperature of air supplied to the refrigerated compartment 420 from the evaporator, an "RT3" condenser inlet air or liquid temperature sensor may measure the temperature of ambient air or inlet liquid in the vicinity of the refrigerator 400, and an "RT4" exhaust air or liquid temperature sensor may measure the temperature of air exhausted or liquid outlet from the vapor cycle refrigeration system at a rear panel of the refrigerator 400. The controller may use data provided by the sensors to control operation of the refrigerator 400 using the actuators.

The controller may poll the sensors at a fixed minimum rate such that all data required to control the performance of the refrigerator 400 may be obtained by the controller in time for real-time operation of the one or more cooling systems within the refrigerator 400. The polled values may be reported by the controller via the RS-232 or infrared interface to a personal computer or PDA and may be reported over a controller area network (CAN) bus. The polled values may also be used in control algorithms by the controller, and may be stored to long-term memory or a data storage medium for later retrieval and analysis.

The controller may provide a self-protection scheme to protect against damage to the refrigerator 400 and its constituent components due to abnormal external and/or internal events such as over-temperature conditions, over-pressure conditions, over-current conditions, etc. and shut down the refrigerator 400 and/or one or more of its constituent components in accordance with the abnormal event. The self-protection scheme may include monitoring critical system sensors and taking appropriate self-protection action when monitored data from the sensors indicate a problem requiring activation of a self-protection action. Such a self-protection action may prevent the refrigerator 400 and/or its constituent components from being damaged or causing an unsafe condition. The self-protection action may also provide appropriate notification via the display panel 460 regarding the monitored problem, the self-protection action, and/or any associated maintenance required. The controller's self-protection scheme may supplement, rather than replace, mechanical protection devices which may also be deployed within the refrigerator 400. The controller may use monitored data from the sensors to intelligently restart the refrigerator 400 and reactivate the desired operational mode after the abnormal event which triggered the self-protection shutdown has terminated or reduced in severity.

The refrigerator 400 may be configured as a modular unit, and may be plug and play insert compatible with ARINC GAIN size 2 locations within the aircraft. (See ARINC Specification 810-2 "Definition of Standard Interfaces for Galley Insert (GAIN) Equipment, Physical Interfaces," available from ARINC Inc., 2551 Riva Road, Annapolis, Md., 21401, http://www.arinc.com.) The refrigerator 400 may have parts which are commonly shared with other galley inserts, such as a refrigerator/oven unit. In some embodiments, the refrigerated compartment 420 may have an approximate interior volume of 40 liters for storing food items, and may be capable of storing 15 wine-bottle sized beverage bottles. In an exemplary embodiment, the refrigerator 400 may weigh approximately 14 kg when empty, and may have external dimensions of approximately 56.1 cm high, 28.5 cm wide, and 56.9 cm deep. Other embodiments may weigh more or less or have different external dimensions, depending on their application.

Figure 5:
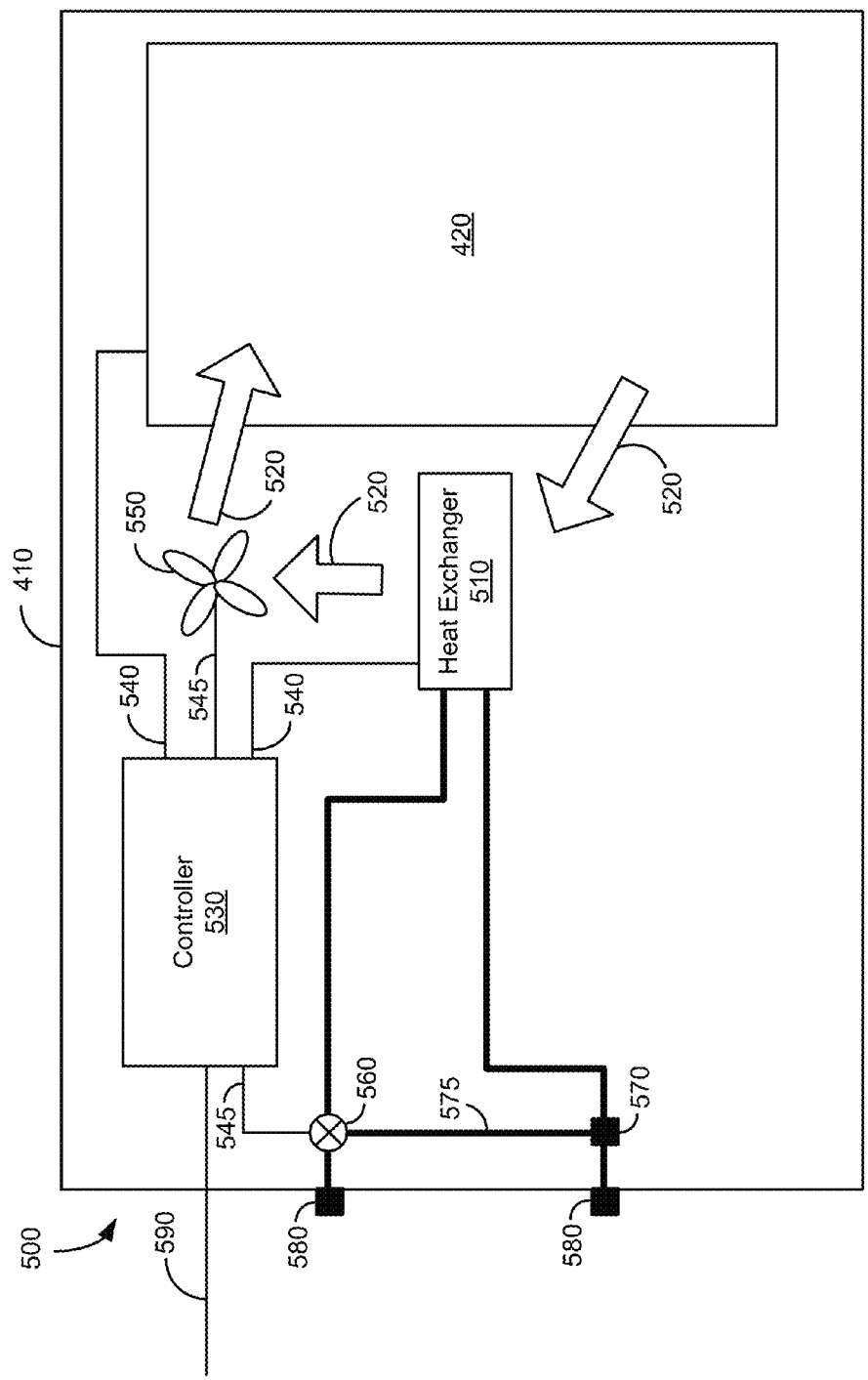
FIG. 5 illustrates an aircraft galley refrigerator having a liquid-to-air heat exchanger, according to an embodiment.

FIG. 5 illustrates an aircraft galley refrigerator 500 having a liquid-to-air heat exchanger 510, according to an embodiment. The aircraft galley refrigerator 500 may be an embodiment of the aircraft galley refrigerator 400. The liquid-to-air heat exchanger 510 may include a forced air convection heat exchanger. The refrigerator 500 effectively has two cooling loops. The first cooling loop comprises the chilled liquid coolant provided to the refrigerator 500 by the LCS of FIG. 1, 2, or 3 via ports 580. The second cooling loop comprises circulation of air 520 through the refrigerated compartment 420 and the liquid-to-air heat exchanger 510. Heat from food and/or beverages in the refrigerated compartment 420 may be transferred to the air 520 which circulates therein. The liquid-to-air heat exchanger 510 may then transfer the heat from the circulating air 520 to the liquid coolant from the LCS.

A fan 550 may include an elongated fan, an axial flow fan, a radial flow fan, or a centrifugal fan. The fan 550 may be configured to cause air to flow through the heat exchanger 510 and out through the fan 550. The fan 550 may be coupled with ducts to direct the flow of the air 520 from the heat exchanger 510 through the fan 550 and into the storage compartment 420. In embodiments where the fan 550 includes an axial flow fan, the fan 550 may receive and output air in a direction approximately parallel with an axis of rotation of blades of the fan 550. In embodiments where the fan 550 includes a radial flow fan, the fan 550 may receive and output air in a direction approximately perpendicular with an axis of rotation of blades of the fan 550. In embodiments where the fan 550 includes a centrifugal fan, the fan 550 may receive air in a direction approximately parallel with an axis of rotation of blades of the fan 550 and output air in a direction approximately perpendicular with the axis of rotation of blades of the fan 550. Air ducts (not shown) may be installed in the enclosure 410 to direct the circulating air 520 out of the refrigerated compartment 420, through the liquid-to-air heat exchanger 510, through the fan 550, and back into the refrigerated compartment 420.

A controller 530 may have a plurality of sensor inputs 540 and control outputs 545 coupled with sensors, motors, actuators, and valves of the refrigerator 500. The sensors may include temperature sensors such as thermisters, pressure sensors, switches, and other sensors of physical conditions as known in the art. The controller 530 may control a coolant control valve (CCV) 560 via a control output 545 to regulate a flow of the chilled liquid coolant from the LCS of FIG. 1, 2, or 3 through the associated port 580 into the liquid-to-air heat exchanger 510 to maintain a precise temperature within the refrigerated compartment 420. The controller 530 may measure the temperature of the air 520 at one or more places in the second cooling loop, such as where the air 520 enters the liquid-to-air heat exchanger 510, exits the liquid-to-air heat exchanger 510, enters the refrigerated compartment 420, exits the refrigerated compartment 420, and/or circulates within the refrigerated compartment 420. The controller 530 may directly control the temperature of the air 520 at a location where the air 520 is measured by actuating the CCV 560, and thereby indirectly control a temperature within the refrigerated compartment 420. In addition, the controller 530 may control the fan 550 via a control output 545 to force the circulating air 520 to circulate through the refrigerated compartment 420 and the liquid-to-air heat exchanger 510. The controller 530 may cause the fan 550 to rotate faster or slower depending upon a measured temperature within the refrigerated compartment 420, the circulating air 520 before or after passing through the liquid-to-air heat exchanger 510, and/or a state of the CCV 560. The controller 530 may also coordinate control of the CCV 560 and the fan 550. The controller 530 may also monitor a thermal switch of the fan 550 which may indicate when the fan 550 has reached an over temperature condition. When the fan 550 overheats, the fan 550 may stop operating due to its thermal switch. The controller 530 may then adjust operations of the refrigerator 500 accordingly, such as by closing the CCV 560, until the over temperature condition has been corrected and the fan 550 may once again be operated.

The controller 530 may output data to and/or receive control commands and data from an external computing system via a data connection 590. In this way, the controller 530 may coordinate control of the refrigerator 500 with other controllers of other refrigerators coupled with the same LCS. In some embodiments, the controller 530 may control the CCV 560 to cause liquid coolant to flow through the heat exchanger 510 in proportion to a magnitude of an electrical signal received from the controller 530. The electrical signal may be related to a measured temperature as described above. In some embodiments, the relationship between the magnitude of the electrical signal and the flow of liquid coolant through the CCV 560 may be approximately linear. For example, the CCV 560 may normally prevent liquid coolant from flowing through the heat exchanger 510 when the measured temperature is at or below a desired threshold temperature, and may facilitate the flow of liquid coolant from the LCS via a port 580 into the heat exchanger 510 in proportion to a temperature difference between the measured temperature and the desired threshold temperature.

The controller 530 may control the refrigerator 500 to function properly when installed in an in-parallel LCS arrangement as in FIG. 1 or when installed in an in-series LCS arrangement as in FIG. 2 or 3. Thus, regardless of whether liquid coolant supplied via the ports 580 is controlled to flow through the heat exchanger 510, and regardless of what the rate of flow is controlled to be, a rate of flow equal to the required flow through the heat exchanger 510 may be maintained between the ports 580 in an in-parallel LCS arrangement, and a full rate of flow between the ports 580 may be continuously maintained in an in-series LCS arrangement.

For example, when installed in an in-parallel LCS arrangement as in FIG. 1, the controller 530 may control the CCV 560 to not allow any liquid coolant to flow through either port 580 when the controller 530 does not permit liquid coolant to flow through the heat exchanger 510. Thus, no liquid coolant would flow through the CCV 560 or the bypass line 575 between the CCV 560 and the three-way connector 570 when the controller 530 does not permit liquid coolant to flow through the heat exchanger 510. The controller 530 may also control the CCV 560 to facilitate a proportionate flow of liquid coolant through the heat exchanger 510 according to cooling needs of the compartment 420 while not permitting any liquid coolant to flow through the bypass line 575 between the CCV 560 and the three-way connector 570.

As another example, when installed in an in-series LCS arrangement as in FIG. 2 or 3, the controller 530 may control the CCV 560 to divert liquid coolant to flow through the three-way connector 570 from one port 580 to the other port 580 via the bypass line 575 when the controller 530 does not permit liquid coolant to flow through the heat exchanger 510. The controller 530 may also control the CCV 560 to facilitate a proportionate flow of liquid coolant through the heat exchanger 510 according to cooling needs of the compartment 420 while facilitating a proportionate flow of liquid coolant to flow through the bypass line 575 between the CCV 560 and the three-way connector 570 such that the total flow of liquid coolant from one port 580 to the other port 580 remains constant. Thus, the controller 530 may control the CCV 560 to ensure that a flow rate of the liquid coolant between both ports 580 is constant while a flow rate of the liquid coolant through the heat exchanger 510 is varied between zero and the full amount of liquid coolant that flows between the ports 580.

The controller 530 may also control a defrost cycle of the refrigerator 500, and provide a signal that the defrost cycle is in progress. The controller 530 may sense ice buildup using a pressure difference device, or the controller 530 may perform the defrost cycle at regular intervals as estimated by an internal timer. The defrost cycle may include controlling the CCV 560 to prevent liquid coolant from flowing through the heat exchanger 510 while operating the fan 550 to circulate the air 520 until all ice is melted. After the defrost cycle is complete, the fan 550 may be shut off for a period of approximately 30 seconds to allow condensate or water which may adhere to the heat exchanger 510 to drop off and drain. Throughout the defrost cycle, condensed water may be collected in a bottom tray of the refrigerator 500 for cleaning.

Figure 6:
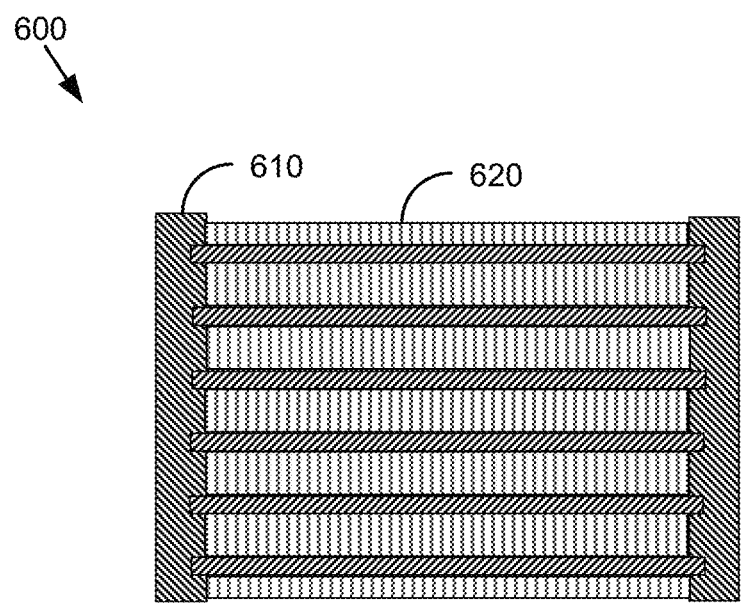
FIG. 6 illustrates a front view of a liquid-to-air heat exchanger, according to an embodiment.

FIG. 6 illustrates a front view of an exemplary liquid-to-air heat exchanger 600. The exemplary liquid-to-air heat exchanger 600 may include an embodiment of the liquid-to-air heat exchanger 510. The liquid-to-air heat exchanger 600 may include a coolant liquid circuit 610 which includes channels through which liquid coolant, such as that provided by the LCS illustrated in FIG. 1, 2, or 3, flows. The liquid-to-air heat exchanger 600 may also include a plurality of plates/fins 620 coupled with the coolant liquid circuit 610. Air, for example the circulating air 520, may be blown through the plurality of plates/fins 620 to cool the air using the liquid coolant flowing through the coolant liquid circuit 610. The plates/fins 620 may efficiently conduct heat to facilitate the transfer of heat from the air to the liquid coolant. The construction of the liquid-to-air heat exchanger 600 including the plates/fins 620 may minimize its size and weight for the required heat exchange performance. The liquid-to-air heat exchanger 600 may be constructed of a strong yet light-weight material such as a high strength aluminum alloy. The liquid-to-air heat exchanger 600 may also include suitable corrosion protection for both internal passages of the coolant liquid circuit 610 and external surfaces. The corrosion protection may be typical of commercial aircraft applications.

Figure 7:
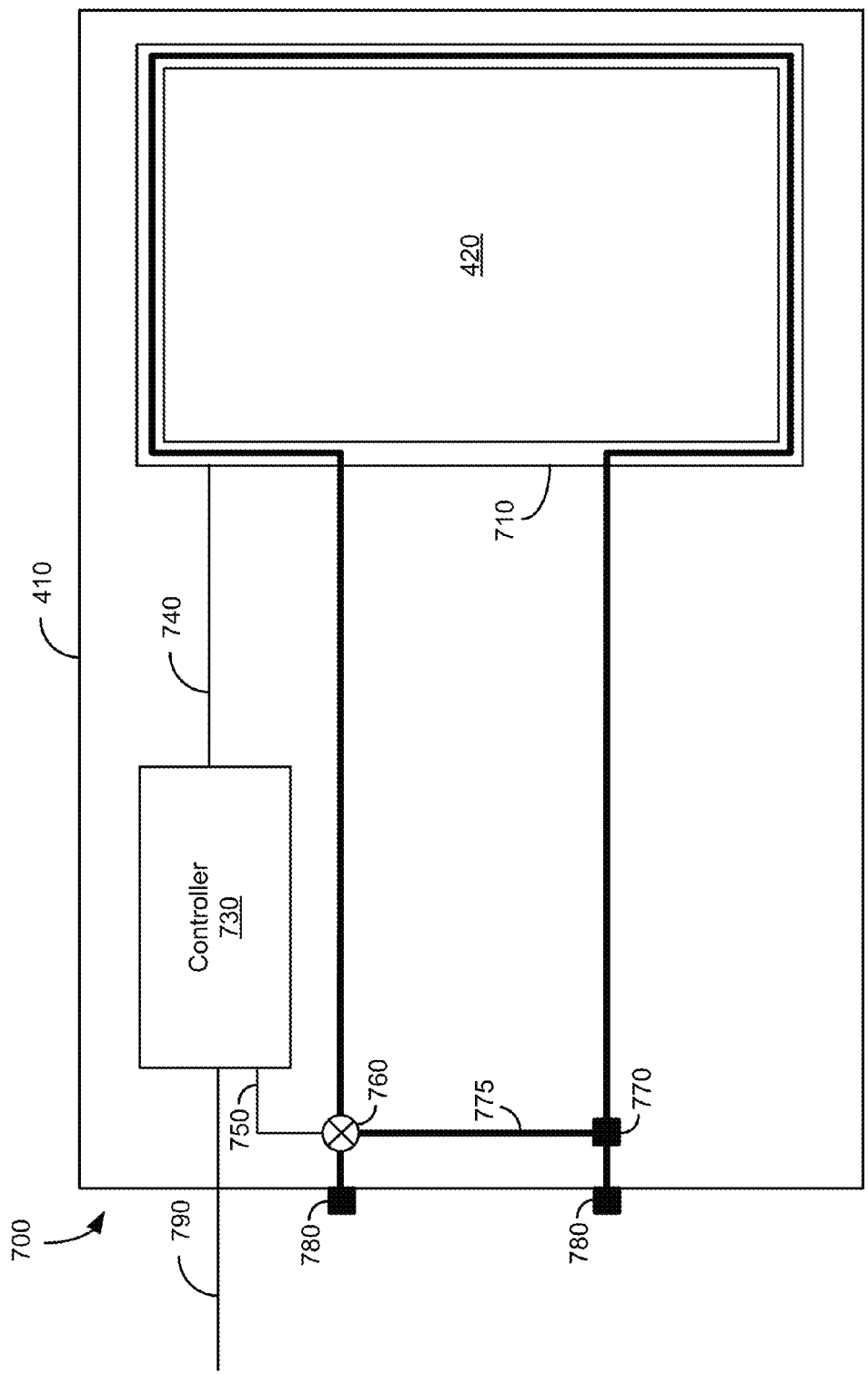
FIG. 7 illustrates an aircraft galley refrigerator having a cold wall conduction heat exchanger, according to an embodiment.

FIG. 7 illustrates an aircraft galley refrigerator 700 having a cold wall conduction heat exchanger 710, according to an embodiment. The aircraft galley refrigerator 700 may be an embodiment of the aircraft galley refrigerator 400. The cold wall conduction heat exchanger 710 may at least partially surround the refrigerated compartment 420 within the enclosure 410. The cold wall conduction heat exchanger 710 may receive chilled liquid coolant from the LCS of FIG. 1, 2, or 3 via one port 780, and output warmed liquid coolant to the LCS via another port 780 after the liquid coolant absorbs heat from the refrigerated compartment 420. The construction of the cold wall conduction heat exchanger 710 in contact with the liner of the refrigerated compartment 420 may facilitate the conduction of heat from the foodstuffs and beverages within the refrigerated compartment 420 to the liquid coolant flowing through the cold wall conduction heat exchanger 710. Because the refrigerator may be an LRU, the ports 780 may facilitate the refrigerator being connected to and disconnected from the LCS rapidly without spilling liquid coolant, for example during removal and reinstallation of the refrigerator 700 for maintenance.

A controller 730 may have a plurality of sensor inputs 740 and control outputs 750 coupled with sensors, motors, actuators, and valves of the refrigerator 700. The sensors may include temperature sensors such as thermisters, pressure sensors, switches, and other sensors of physical conditions as known in the art. The controller 730 may control a coolant control valve (CCV) 760 via a control output 750 to regulate a flow of the chilled liquid coolant from the LCS of FIG. 1, 2, or 3 through the associated port 780 into the cold wall conduction heat exchanger 710 to maintain a precise temperature within the refrigerated compartment 420. The controller 730 may monitor air temperature at one or more places within the refrigerated compartment 420 using one or more temperature sensors via the sensor monitor input 740. The controller 730 may directly control the temperature of the air at a location where the air is measured by actuating the CCV 760, and thereby indirectly control a temperature within the refrigerated compartment 420 at other locations.

The controller 730 may output data to and/or receive control commands and data from an external computing system via a data connection 790. In this way, the controller 730 may coordinate control of the refrigerator 700 with other controllers of other refrigerators coupled with the same LCS. In some embodiments, the CCV 760 may be controlled to cause liquid coolant to flow through the heat exchanger 710 in proportion to a magnitude of an electrical signal received from the controller 730. The electrical signal may be related to a temperature measured within the refrigerated compartment 420. In some embodiments, the relationship between the magnitude of the electrical signal and the flow of liquid coolant through the CCV 760 may be approximately linear. For example, the CCV 760 may normally prevent liquid coolant from flowing through the heat exchanger 710 when the measured temperature within the refrigerated compartment 420 is at or below a desired threshold temperature, and may facilitate the flow of liquid coolant from the LCS via a port 780 into the heat exchanger 710 in proportion to a temperature difference between the measured temperature of the refrigerated compartment 420 and the desired threshold temperature. The controller 730 may also control the refrigerator 700 to function properly when installed in an in-parallel LCS arrangement as in FIG. 1 or when installed in an in-series LCS arrangement as in FIG. 2 or 3 as described above with respect to the controller 530 of the refrigerator 500 of FIG. 5.

For example, when installed in an in-parallel LCS arrangement as in FIG. 1, the controller 730 may control the CCV 760 to not allow any liquid coolant to flow through either port 780 when the controller 730 does not permit liquid coolant to flow through the heat exchanger 710. Thus, no liquid coolant would flow through the CCV 760 or a bypass line 775 between the CCV 760 and a three-way connector 770 when the controller 730 does not permit liquid coolant to flow through the heat exchanger 710. The controller 730 may also control the CCV 760 to facilitate a proportionate flow of liquid coolant through the heat exchanger 710 according to cooling needs of the compartment 420 while not permitting any liquid coolant to flow through the bypass line 775 between the CCV 760 and the three-way connector 770.

As another example, when installed in an in-series LCS arrangement as in FIG. 2 or 3, the controller 730 may control the CCV 760 to divert liquid coolant to flow through the three-way connector 770 from one port 780 to the other port 780 via the bypass line 775 when the controller 730 does not permit liquid coolant to flow through the heat exchanger 710. The controller 730 may also control the CCV 760 to facilitate a proportionate flow of liquid coolant through the heat exchanger 710 according to cooling needs of the compartment 420 while facilitating a proportionate flow of liquid coolant to flow through the bypass line 775 between the CCV 760 and the three-way connector 770 such that the total flow of liquid coolant from one port 780 to the other port 780 remains constant. Thus, the controller 730 may control the CCV 760 to ensure that a flow rate of the liquid coolant between both ports 780 is constant while a flow rate of the liquid coolant through the heat exchanger 710 is varied between zero and the full amount of liquid coolant that flows between the ports 780.

Figure 8:
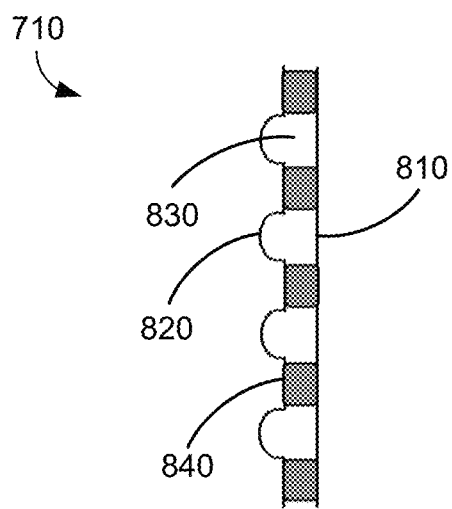
FIG. 8 illustrates a construction for the cold wall conduction heat exchanger of FIG. 7, according to an embodiment.

FIG. 8 illustrates a construction for the cold wall conduction heat exchanger 710 of FIG. 7, according to an embodiment. The cold wall conduction heat exchanger 710 may include an inner liner 810 constructed of sheet metal on a side facing an interior of the refrigerated compartment 420. The cold wall conduction heat exchanger 710 may also include an exterior surface 820 constructed of a material which is a good conductor of heat, such as sheet metal. A coolant circuit 830 may be formed between the inner liner 810 and the exterior surface 820. The coolant circuit 830 may include channels through which the liquid coolant from the LCS flows. The channels of the coolant circuit 830 may be separated by brazing material 840. The coolant circuit 830 may be stamped onto the sheet metal of the inner liner 810 and/or the exterior surface 820 with graphite and may be assembled by a rolling process.

Figure 9:
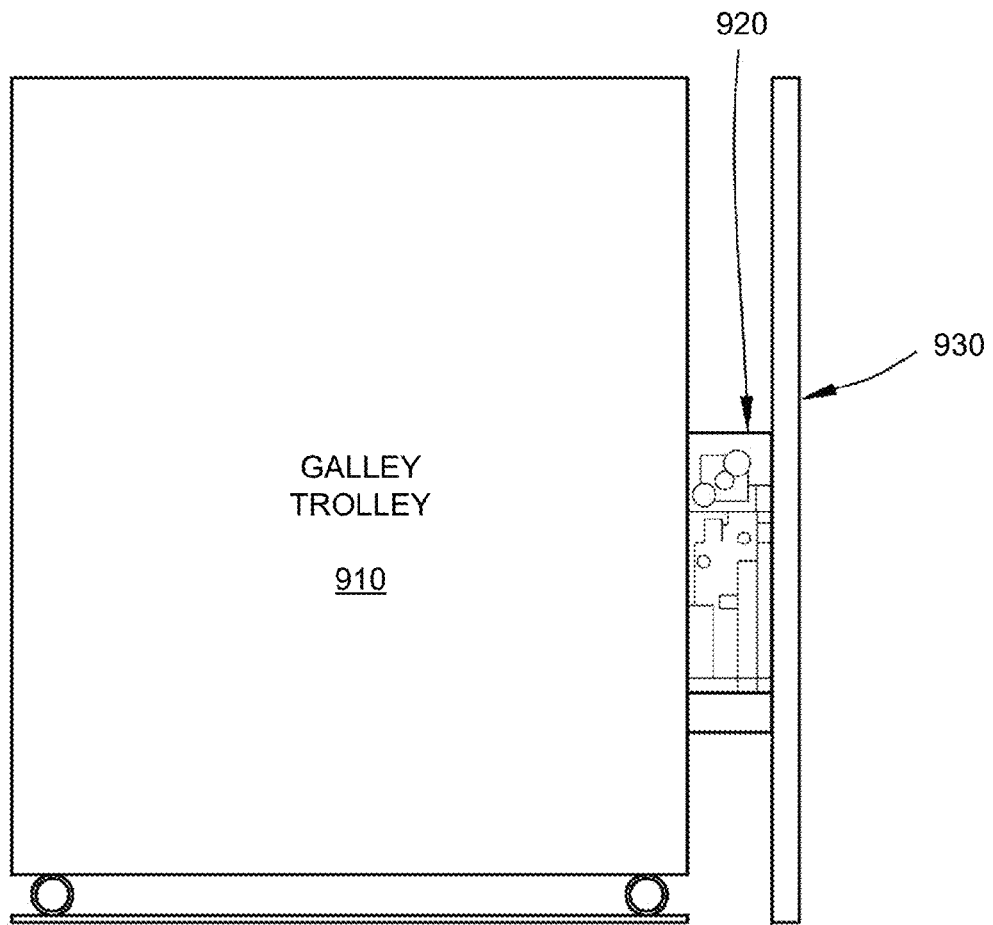
FIG. 9 illustrates a side view of a refrigerated galley trolley having a storage compartment cooling apparatus (SCCA) disposed at a rear side thereof, according to an embodiment.

FIG. 9 illustrates a side view of a refrigerated galley trolley 910 having a storage compartment cooling apparatus (SCCA) 920 disposed at a rear side thereof, according to an embodiment. An aircraft galley may include more than one galley trolley parked side by side, and one or more of these galley trolleys may be embodiments of the refrigerated galley trolley 910. Aircraft galleys which include more than one galley trolley 910 may include a service column between two galley trolleys 910. The service column may also be referred to as a galley center console. The service column may include galley infrastructure components (e.g., piping and wiring) to support the galley trolleys 910 and/or other equipment installed in the aircraft galley, e.g. a microwave oven (not shown). Each galley trolley 910 may include a handle on the front of the galley trolley 910 and/or wheels on the bottom of the galley trolley 910 to facilitate installation and removal of the galley trolley 910 from the aircraft galley.

To the rear of the galley trolley 910 may be a wall 930. The wall 930 may include a rear wall of the galley. The wall 930 may also include wall insulation configured to provide noise suppression properties to minimize an amount of noise from the SCCA 920 heard in a passenger cabin of the aircraft. Wall insulation may also be included in a wall panel attached against the wall 930, or between the wall 930 and the SCCA 920. The wall insulation may also reduce or prevent condensation from the SCCA 920 from reaching the wall 930 or forming on the wall 930 due to operation of the SCCA 920.

In other embodiments, the SCCA 920 may be disposed at a side of a galley trolley 910 in a service column between adjacent galley trolleys 910. By installing the SCCA 920 at the side of the galley trolley 910 in the service column, a depth of the galley trolley 910 may be maximized because the rear of the galley trolley 910 may be able to be closer to the back wall 930 of the galley without the SCCA 920 therebetween. In some embodiments, ducts (not shown) may route air between the SCCA 920 and the rear or side of the galley trolley 910.

In various other embodiments, an SCCA (e.g., the SCCA 920) may be installed at a top or at a bottom of a galley trolley such as the galley trolley 910. Because the SCCA may be thinner than in the prior art, locations separate from the galley trolley (e.g., above and below the galley trolley), which may have been unsuitable for installation of a refrigerator or storage compartment cooling apparatus of the prior art due to space constraints, may be suitable to installation of embodiments of the SCCA as described herein. For example, an embodiment of the SCCA may be installed below a floor panel upon which the galley trolley rests. As another example, another embodiment of the SCCA may be installed under a work deck of the galley above the galley trolley. As a third example, yet another embodiment of the SCCA may be installed above the galley in which the galley trolley is located. A duct system may be installed between the SCCA at any location at which the SCCA is installed and the storage compartment of the galley trolley to route cool air from the SCCA to the storage compartment.

Figure 10:
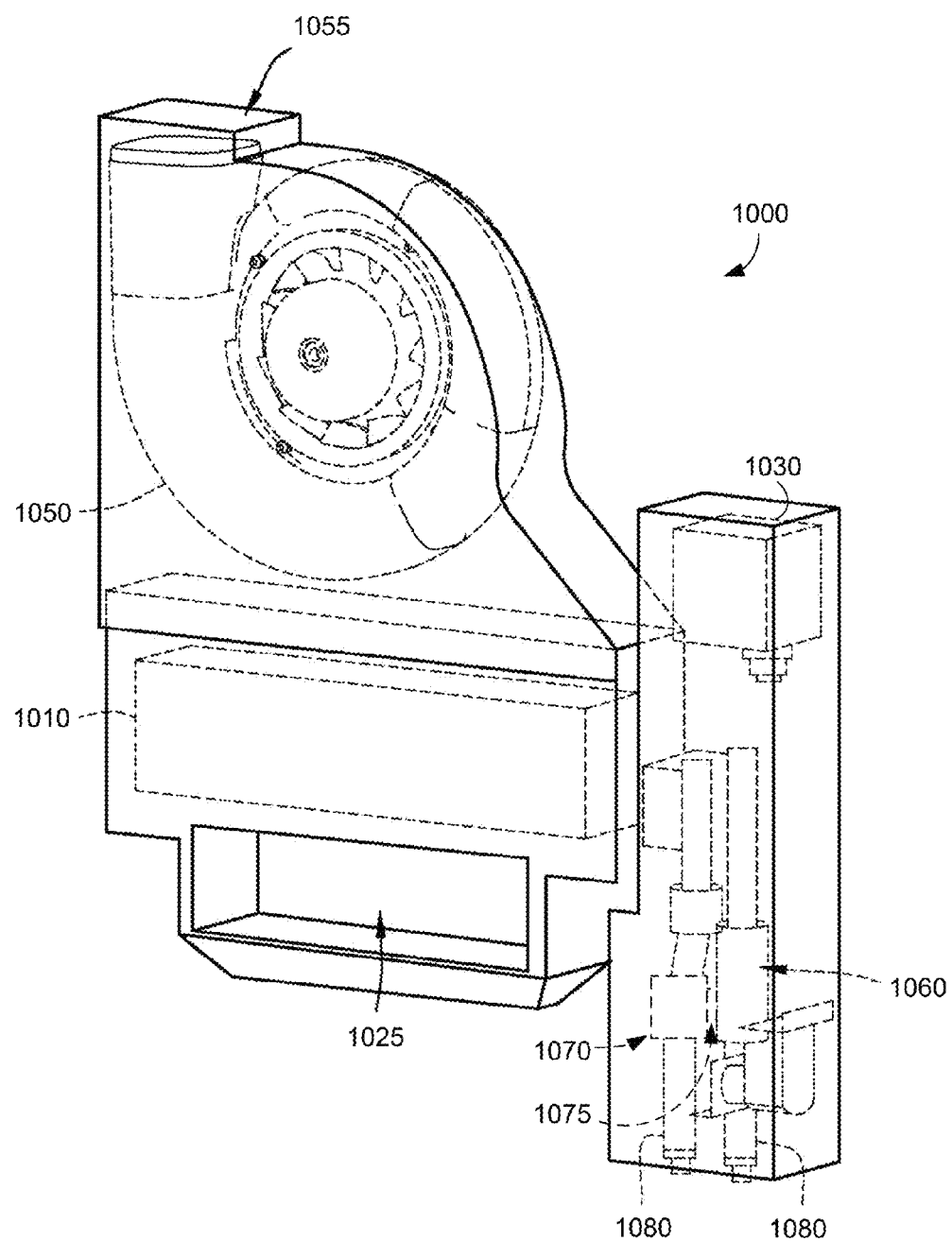
FIG. 10 illustrates an SCCA, according to an embodiment.

FIG. 10 illustrates an SCCA 1000, according to an embodiment. The SCCA 1000 illustrated in FIG. 10 may be an embodiment of the SCCA 920 of FIG. 9. The SCCA 1000 may operate in a manner similar to that described with reference to FIG. 5. The SCCA 1000 may also include a three-way connector 1070 and a bypass line 1075 similar in function and arrangement of the three-way connector 570 and bypass line 575 of the refrigerator 500 as shown in FIG. 5. The SCCA 1000 may include a controller 1030 that causes liquid coolant received from the LCS of FIG. 1, 2, or 3 via a port 1080 to circulate through a heat exchanger 1010 by controlling a CCV 1060 in a manner similar to the refrigerator 500 of FIG. 5.

The CCV 1060 controllably directs or partitions the flow of the liquid coolant into the SCCA 1000 via the input port 1080 between the flow of the liquid coolant through the heat exchanger 1010 and the flow of the liquid coolant through the bypass line 1075 into the three-way connector 1070. The CCV 1060 may be controlled according to the measured temperature of the liquid coolant exiting the heat exchanger 1010. For example, in an in-series installation of multiple SCCAs 1000, when the measured temperature of the liquid coolant exiting the heat exchanger 1010 is lower than a preset threshold, the CCV 1060 may be controlled to allow no liquid coolant to pass into the heat exchanger 1010, but rather to divert all the liquid coolant through the bypass line 1075 into the three-way connector 1070 and out the output port 1080 to flow to the next SCCA 1000 in series. As another example, in an in-parallel installation of multiple SCCAs 1000, when the measured temperature of the liquid coolant exiting the heat exchanger 1010 is lower than a preset threshold, the CCV 1060 may be controlled to allow no liquid coolant to pass into the CCV 1060 at all, such that no liquid coolant flows into the heat exchanger 1010 or into the bypass line 1075.

A centrifugal fan 1050 may be configured to input air from a direction parallel with a rotational axis of the centrifugal fan 1050. A centrifugal fan may provide a higher aerodynamic efficiency than other types of fans at the airflow requirements of the SCCA 1000. Accordingly, a centrifugal fan may therefore minimize any loss of performance due to rejected heat. A centrifugal type fan may also minimize space requirements, facilitating a more compact SCCA 1000.

The centrifugal fan 1050 may include a housing assembly 1055 configured to direct the air from an air duct assembly 1025 through the heat exchanger 1010 and then into the centrifugal fan 1050. The housing assembly 1055 may then direct the air output from the centrifugal fan 1050 in a direction perpendicular to the axis of rotation of the centrifugal fan 1050 via a volute. A cooled air duct assembly (not shown) may couple with the housing assembly 1055 to route the cooled air output from the centrifugal fan 1050 to a storage compartment in the galley trolley 910 to cool the storage compartment. In some embodiments, the cooled air duct assembly may direct the cooled air into the storage compartment of the galley trolley 910. In alternative embodiments, the cooled air duct assembly may direct the cooled air exterior to and alongside an interior wall of the storage compartment.

Figure 11:
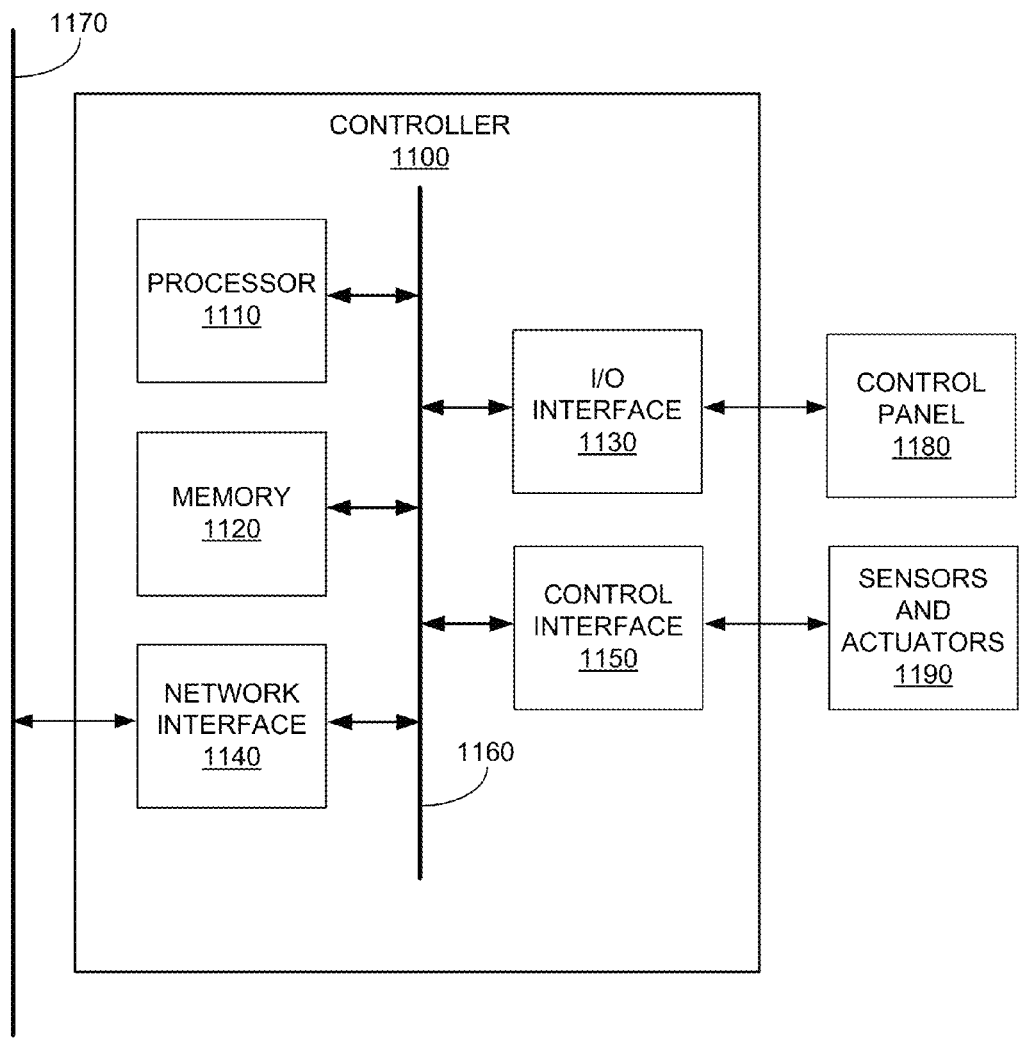
FIG. 11 illustrates a controller for an LCS of an aircraft having a recirculation cooling device, according to an embodiment.

FIG. 11 illustrates a controller 1100 for an LCS of an aircraft having a recirculation cooling device 110, according to an embodiment. Embodiments of the controller 1100 may control the LCS of FIG. 1, 2, or 3, including the recirculation cooling device 110 and the SCCA's 160-190, 260-290, or 360-390. Embodiments of the controller 1100 may be included in the recirculation cooling device 110 and control the remote chiller 120, the circulation unit 130, and/or the reversible flow unit 310.

The controller 1100 may receive input commands remotely over a data communications network 1170 or input from a user via the control panel 1180, such as turning the LCS on or off, selecting an operation mode, setting a desired temperature of the liquid coolant chilled by the remote chiller 120, setting a flow rate of the circulation unit 130, or setting a circulation flow direction of the reversible flow unit 310. The controller 1100 may output information to the user regarding an operational status (e.g., operational mode, activation of a defrost cycle, shut-off due to over-temperature conditions of components of the remote chiller 120, etc.) of the LCS using a display panel of the control panel 1180 or remotely over the data communications network 1170. The controller 1100 may be coupled with the control panel 1180 using shielded and twisted cables, and may communicate with the control panel 1180 using an RS-232 communication protocol due to its electrically robust characteristics.

The controller 1100 may include a processor 1110 that performs computations according to program instructions, a memory 1120 that stores the computing instructions and other data used or generated by the processor 1110, and a network interface 1140 that includes data communications circuitry for interfacing to the data communications network 1170. The data communications network 1170 may include an Ethernet network, Galley Area Network (GAN), or Controller Area Network (CAN). In addition, the network interface 1140 may include a node of a power management data bus network. Exemplary power management data bus networks include ARINC 812 power management functionality.

The network interface 1140 may also include an integral part of a Supplemental Cooling System's CAN Bus network as well as a CAN Bus node member on an ARINC 812 Galley Data Bus (GDB). The processor 1110 may include a microprocessor, a Field Programmable Gate Array, an Application Specific Integrated Circuit, a custom Very Large Scale Integrated circuit chip, or other electronic circuitry that performs a control function. The processor 1110 may also include a state machine. The controller 1100 may also include one or more electronic circuits and printed circuit boards. The processor 1110, memory 1120, and network interface 1140 may be coupled with one another using one or more data buses 1160. The controller 1100 may communicate with and control various sensors and actuators 1190 of the remote chiller 120, circulation unit 130, and/or reversible flow unit 310 via a control interface 1150.

The controller 1100 may be configured on or with an aluminum chassis or sheet metal box, which may be grounded and largely opaque to high-frequency energy transmission. Wires which carry high voltage and/or high frequency signals into or out of the controller 1100 may be twisted and/or shielded to reduce RF radiation, susceptibility, and EMI. Low frequency and low-voltage carrying wires may typically be filtered at the printed circuit board of the controller 1100 to bypass any high-frequency noise to ground.

The controller 1100 may be controlled by or communicate with a centralized computing system, such as one onboard an aircraft. The controller 1100 may implement a compliant ARINC 812 logical communication interface on a compliant ARINC 810 physical interface. The controller 1100 may communicate via the Galley Data Bus (e.g., galley networked GAN bus), and exchange data with a Galley Network Controller (e.g., Master GAIN Control Unit as described in the ARINC 812 specification). In accordance with the ARINC 812 specification, the controller 1100 may provide network monitoring, power control, remote operation, failure monitoring, and data transfer functions. The controller 1100 may implement menu definitions requests received from the Galley Network Controller (GNC) for presentation on a GNC touch panel display device and process associated button push events to respond appropriately. The controller 1100 may provide additional communications using an RS-232 communications interface and/or an infrared data port, such as communications with a personal computer (PC) or a personal digital assistant (PDA). Such additional communications may include real-time monitoring of operations of the recirculation cooling device 110, long-term data retrieval, and control system software upgrades. In addition, the control interface 1150 may include a serial peripheral interface (SPI) bus that may be used to communicate between the controller 1100 and motor controllers within the remote chiller 120, circulation unit 130, and/or reversible flow unit 310.

The controller 1100 may poll the sensors of the sensors and actuators 1190 at a fixed minimum rate such that all data required to control the performance of the LCS may be obtained by the controller 1100 in time for real-time operation of the recirculation cooling device 110 and/or the reversible flow unit 310. The polled values may be reported by the controller 1100 via the I/O interface 1130 and/or the network interface 1140. The polled values may also be used in control algorithms by the controller 1100, and may be stored to long-term memory or a data storage medium for later retrieval and analysis.

The controller 1100 may provide a self-protection scheme to protect against damage to the LCS including the recirculation cooling device 110, reversible flow unit 310, SCCA's 160-190, 260-290, or 360-390, and their constituent components due to abnormal external and/or internal events such as over-temperature conditions, over-pressure conditions, over-current conditions, etc. and shut down the LCS and/or one or more of its constituent components in accordance with the abnormal event. The self-protection scheme may include monitoring critical system sensors and taking appropriate self-protection action when monitored data from the sensors indicate a problem requiring activation of a self-protection action. Such a self-protection action may prevent the LCS and/or its constituent components from being damaged or causing an unsafe condition. The self-protection action may also provide appropriate notification via the control panel 1180 regarding the monitored problem, the self-protection action, and/or any associated maintenance required. The controller's self-protection scheme may supplement, rather than replace, mechanical protection devices which may also be deployed within the LCS. The controller 1100 may use monitored data from the sensors to intelligently restart the LCS and reactivate the desired operational mode after the abnormal event which triggered the self-protection shut-down has terminated or reduced in severity.

Figure 12:
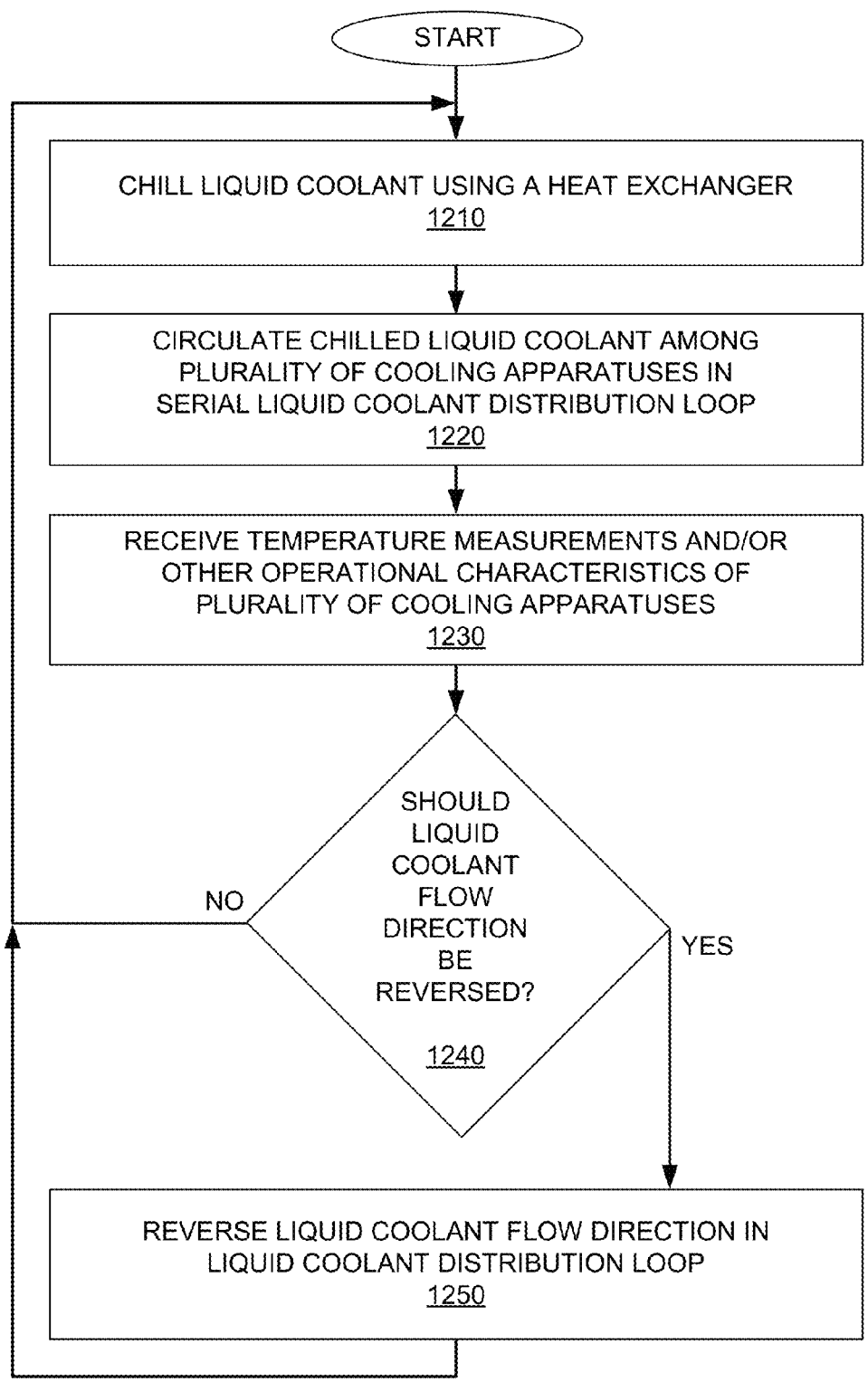
FIG. 12 illustrates a method of controlling an LCS of an aircraft having a recirculation cooling device that cools and circulates liquid coolant in a liquid coolant distribution loop among a plurality of SCCA's in a reversible-direction serial distribution arrangement as illustrated in FIG. 3, according to an embodiment.

FIG. 12 illustrates a method of controlling an LCS of an aircraft having a recirculation cooling device 110 that cools and circulates liquid coolant in a liquid coolant distribution loop among a plurality of SCCA's in a reversible-direction serial distribution arrangement as illustrated in FIG. 3, according to an embodiment. The LCS may be controlled by a controller such as that described with reference to FIG. 11.

In a step 1210, the remote chiller 120 is controlled to chill liquid coolant to a set temperature lower than an ambient temperature within a specified range using a heat exchanger. For example, the remote chiller 120 may be controlled to chill the liquid coolant to approximately −8 degrees C., plus or minus 1 degree C., or plus or minus 2 degrees C. The remote chiller may chill the liquid coolant using a vapor cycle system, or by transferring heat from the liquid coolant to the atmosphere outside the aircraft when the aircraft is above a threshold altitude, such as 16,000 feet.

In a step 1220, the circulation unit 130 may be controlled to circulate the chilled liquid coolant in a serial liquid coolant distribution loop among a plurality of cooling apparatuses. The liquid coolant may be circulated through the liquid coolant distribution loop at a specified flow rate and pressure. For example, the circulation unit 130 may be controlled to circulate the liquid coolant such that the liquid coolant enters the input port 145 and exits the output port 140 of the recirculation cooling device 110 at a flow rate of approximately 10 gallons per minute at approximately 100 pounds per square inch (psi).

In a step 1230, temperature measurements and/or other operational characteristics of the plurality of cooling apparatuses among which the chilled liquid coolant is circulated in the liquid coolant distribution loop are received by the controller. The controller may poll the SCCA's 360-390 over a data communications network to determine a temperature of the liquid coolant flowing into and/or out of each of the SCCA's 360-390 and/or to determine a temperature associated with their respective storage compartments, and/or to obtain other operational characteristics of the SCCA's 360-390.

In a step 1240, a decision is made as to whether the flow direction of the liquid coolant in the liquid coolant distribution loop should be reversed. In some embodiments, the decision may be made based on whether a measured temperature difference between a first SCCA (e.g., SCCA 360) along the liquid coolant distribution loop that receives the liquid coolant from the reversible flow unit 310 and a last SCCA (e.g., SCCA 390) that returns the liquid coolant to the reversible flow unit 310 exceeds a temperature difference threshold, for example, a value less than approximately 4° C. In some embodiments, temperatures of different SCCA's may be used in the comparison, such as an SCCA with a highest temperature measurement and an SCCA with a lowest temperature measurement. The measured temperatures used in the comparison may include a temperature of air entering, within, or exiting a storage compartment associated with the SCCA; and a temperature of air entering or exiting a liquid-to-air heat exchanger (e.g., heat exchanger 510).

In other embodiments, the controller may cause the reversible flow unit 310 to reverse the flow of liquid coolant according to a time schedule, such that the direction of flow is reversed after a set period of time since the prior reversal of the flow direction. In these embodiments, the flow may be in a first direction for a time period such as 15 minutes, then reverse to an opposite direction for another time period such as 15 minutes, and then reverse again, etc.

In a step 1250, when it is determined in step 1240 that the liquid coolant flow direction should be reversed, the flow direction of the liquid coolant in the liquid coolant distribution loop may be reversed by the reversible flow unit 310. For example, the reversible flow unit 310 may proportionally change the state of all of the valves V1, V2, V3, and V4 simultaneously in such a way that there is a gradual reduction in flow rate of the liquid coolant in the liquid coolant distribution loop before the reversal of the flow direction followed by a gradual increase in the flow rate of the liquid coolant in the liquid coolant distribution loop until the valves V1, V2, V3, and V4 reach their new steady state operating position. In some embodiments, the flow direction may be reversed by first turning off a pump of the circulation unit 130 to stop the flow of liquid coolant, and then changing each of the valves V1, V2, V3, and V4 from their present state to an opposite state. For example, when the valves V1 and V2 are open while the valves V3 and V4 are closed, the reversible flow unit 310 may reverse the flow of liquid coolant by closing valves V1 and V2 and opening valves V3 and V4 as illustrated in FIG. 3. After the states of the valves are changed, the pump of the circulation unit 130 may be restarted again. In other embodiments, operation of the pump of the circulation unit 130 may not be altered while the reversible flow unit 310 reverses the flow of liquid coolant in the liquid coolant distribution loop. Following step 1250, the method returns to step 1210 to continue operation of the LCS.

By periodically reversing the flow direction of the liquid coolant in the liquid coolant distribution loop, the difference in temperatures of the liquid coolant between different SCCA's may be reduced, and may be prevented from causing the affected SCCA(s) having higher liquid coolant temperatures to no longer be able to maintain proper operating temperatures of the respective storage compartment(s). Thus, the LCS of FIG. 3 may maintain proper operating temperatures of the liquid coolant and/or the storage compartments of the SCCA's across the full chain of SCCA's 360-390, whereas proper operating temperatures may not be maintained otherwise. Accordingly, more SCCA's may be connected together in series in the LCS of FIG. 3 than in the LCS of FIG. 2 while maintaining proper operating temperatures across the full chain of SCCA's.

In addition, a flow rate of the LCS of FIG. 3 required to maintain proper operating temperatures across the full chain of SCCA's may be lower than that required for the LCS of FIG. 2. Furthermore, because periodically reversing the flow direction of the chilled liquid coolant in the liquid coolant distribution loop lowers the average temperature of the liquid coolant received from the LCS by each of the SCCA's 360-390 toward the ends of the liquid coolant distribution loop, other design and construction aspects of the LCS of FIG. 3 and/or the SCCA's 360-390 may be simplified or made lower cost compared to those of the LCS of FIG. 2 and/or the SCCA's 260-290. This is because a lower average temperature of the liquid coolant flowing through the SCCA improves efficiency of cooling the storage compartment. As a result, the SCCA's 360-390 may have a lower weight and occupy less space than the SCCA's 260-290.

Although not specifically described, it will be understood that features, characteristics, and functions discussed herein as associated with one component may also be applicable to another component discussed herein unless contradicted by context. For example, any of the features, characteristics, and functions discussed herein as associated with one of the controller 1100, controller 530, and controller 730 may also be applicable to other controllers in an LCS. As another example, any of the features, characteristics, and functions discussed herein as associated with one of the remote chiller 120, refrigerators 500 and 700, and SCCA's 920 and 1000 may also be applicable to other chillers, refrigerators, and SCCA's in an LCS.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

TABLE OF ACRONYMS AND ABBREVIATIONS

| | |
|---|---|
| ARINC | ARINC Inc. (originally Aeronautical Radio, Incorporated), 2551 Riva Road, Annapolis, Maryland, 21401, http://www.arinc.com |

-continued

TABLE OF ACRONYMS AND ABBREVIATIONS

| | |
|---|---|
| LRU | line replaceable unit |
| SCCA | storage compartment cooling apparatus |
| LCS | liquid cooling system |
| PGW | a solution of propylene, glycol, and water |
| C. | Celsius or centigrade |
| VAC | volts alternating current |
| Hz | Hertz |
| AC | alternating current |
| DC | direct current |
| EMI | electromagnetic interference |
| LCD | liquid crystal display |
| LED | light emitting diode |
| ITO | Indium Tin Oxide |
| RF | radio frequency |
| CAN | controller area network |
| GAN | galley area network |
| GAIN | galley insert |
| GNC | galley network controller |
| GDB | galley data bus |
| FPGA | field programmable gate away |
| VLSI | very large scale integrated circuit |
| RS-232 | Recommended Standard 232, also "EIA232 Standard" |
| EIA | Electronic Industries Association |
| PDA | personal digital assistant |
| PC | personal computer |
| SPI | serial peripheral interface bus |
| PCB | printed circuit board |
| cm | centimeter |
| kg | kilogram |
| CCV | coolant control valve |
| $H_2O$ | chemical formula for water |
| GALDEN ® | registered trademark of Solvay Solexis, Inc. for a proprietary heat transfer fluid |

What is claimed is:

1. A storage compartment cooling system comprising:
a liquid coolant distribution loop that distributes a chilled liquid coolant to a plurality of storage compartment cooling apparatuses coupled with the liquid coolant distribution loop, the liquid coolant of the liquid circulation distribution loop not undergoing compression by a compressor of a vapor cycle system;
a recirculation cooling device including a chiller that chills the liquid coolant to have a temperature lower than an ambient temperature and a circulation unit that circulates the chilled liquid coolant through the liquid coolant distribution loop; and
the plurality of storage compartment cooling apparatuses coupled with the liquid coolant distribution loop, the plurality of storage compartment cooling apparatuses arranged in one of two configurations:
1) in an in-parallel configuration, where each storage compartment cooling apparatus is in parallel flow with respect to the other storage compartment cooling apparatuses, or
2) in an in-series configuration, where each storage compartment cooling apparatus is in series flow with respect to the other storage compartment cooling apparatuses;
each of the plurality of storage compartment cooling apparatuses including:
1) a liquid circulation system having a first port and a second port, each of the first port and second port in fluid communication with the liquid coolant distribution loop such that one of the first and second ports receives the liquid coolant from and the other of the first and second ports returns the liquid coolant to the liquid coolant distribution loop, the liquid circulation system configured to circulate the liquid coolant between the first port and the second port;

2) a heat exchanger disposed in the liquid circulation system between the first port and the second port and through which the liquid coolant flows to cool an interior of a storage compartment by transferring heat from the interior of the storage compartment into the liquid coolant;

3) a bypass line disposed in the liquid circulation system in parallel with the heat exchanger and through which liquid coolant selectively flows to bypass the heat exchanger;

4) one or more valves that controllably increase and decrease the flow of the liquid coolant through the heat exchanger and controllably increase and decrease the flow of the liquid coolant through the bypass line; and 5) a controller that controls the one or more valves to increase and decrease the flow of the liquid coolant through the heat exchanger and increase and decrease the flow of the liquid coolant through the bypass line;

wherein each of the controllers is configured to receive a control signal indicating whether the storage compartment cooling apparatuses are in the in-parallel configuration or the in-series configuration, the controller programmed to execute the following control scheme in response to the control signal:

in the in-parallel liquid circulation configuration, the controller controls the one or more valves to substantially prevent the flow of liquid coolant through the bypass line regardless of the flow of liquid coolant through the heat exchanger such that the total flow of liquid coolant through the liquid circulation system between the first port and the second port is substantially equal to the flow of liquid coolant through the heat exchanger, and in the in-series liquid circulation configuration, the controller proportionally controls the one or more valves to increase and decrease the flow of the liquid coolant through the bypass line in reverse correspondence with the increase and decrease of the flow of the liquid coolant through the heat exchanger such that the total flow of liquid coolant through the liquid circulation system between the first port and the second port is substantially constant while the flow of the liquid coolant through each of the bypass line and heat exchanger change.

2. The storage compartment cooling system of claim 1, further comprising a reversible flow unit that reverses a direction of flow of the liquid coolant through the liquid coolant distribution loop, wherein the plurality of storage compartment cooling apparatuses are coupled in series with the liquid coolant distribution loop and each of the plurality of storage compartment cooling apparatuses are in the in-series liquid circulation mode.

3. The storage compartment cooling system of claim 2, further comprising a controller that controls the reversible flow unit to reverse the direction of flow of the liquid coolant through the liquid coolant distribution loop based on at least a measured temperature of the liquid coolant received from at least one of the plurality of storage compartment cooling apparatuses.

4. The storage compartment cooling system of claim 2, further comprising a controller that controls the reversible flow unit to reverse the direction of flow of the liquid coolant through the liquid coolant distribution loop based on at least a duration of time elapsed since the direction of flow was last reversed.

5. The storage compartment cooling system of claim 2, wherein the direction of flow of the liquid coolant through the recirculation cooling device is not reversed while the direction of flow through the liquid coolant distribution loop is reversed.

6. The storage compartment cooling system of claim 5, wherein the reversible flow unit includes at least four valves disposed in a circulation pattern to control a flow of the liquid coolant between the recirculation cooling device and the liquid coolant distribution loop, wherein when the direction of flow of the liquid coolant in the liquid coolant distribution loop is in a forward direction, a first two of the four valves are open while a second two of the four valves are closed, and when the direction of flow of the liquid coolant in the liquid coolant distribution loop is in a reverse direction, the first two of the four valves are closed while the second two of the four valves are open.

7. The storage compartment cooling system of claim 1, wherein each of the plurality of storage compartment cooling apparatuses further includes a temperature sensor that measures a temperature associated with at least one of the storage compartment, the liquid circulation system, and an air circulation loop between the heat exchanger and the storage compartment, and wherein the controller controls the one or more valves in response to a measurement of the temperature received from the temperature sensor.

8. The storage compartment cooling system of claim 1, wherein each of the plurality of storage compartment cooling apparatuses further includes a fan, wherein the heat exchanger includes a liquid-to-air heat exchanger, and wherein the fan circulates air in a loop between the liquid-to-air heat exchanger and the storage compartment.

9. The storage compartment cooling system of claim 8, wherein the controller of each of the plurality of storage compartment cooling apparatuses performs a defrost cycle by controlling the one or more valves to prevent the flow of liquid coolant through the heat exchanger while operating the fan to circulate air in the loop between the liquid-to-air heat exchanger and the storage compartment.

10. The storage compartment cooling system of claim 8, wherein each of the plurality of storage compartment cooling apparatuses further includes a duct configured to direct the air into contact with the liquid-to-air heat exchanger and through the fan, and wherein the fan is a centrifugal fan configured to cause the air to flow into the fan from a direction approximately parallel with an axis of rotation of the fan and output the air to a direction approximately perpendicular with the axis of rotation of the fan.

11. The storage compartment cooling system of claim 1, wherein the heat exchanger of each of the plurality of storage compartment cooling apparatuses includes a cold wall conduction heat exchanger in thermal communication with the storage compartment.

12. A method of controlling a storage compartment cooling system comprising a plurality of storage compartment cooling apparatuses and a liquid coolant distribution loop coupled with the plurality of storage compartment cooling apparatuses to distribute a chilled liquid coolant to the plurality of storage compartment cooling apparatuses, each of the plurality of storage compartment cooling apparatuses including a controller and a bypass line disposed in parallel with a heat exchanger using one or more valves configured to selectively divert the liquid coolant from the liquid coolant distribution loop through the bypass line to bypass the heat exchanger, the liquid coolant not undergoing compression by a compressor of a vapor cycle system, the method comprising:

chilling the liquid coolant to have a temperature lower than an ambient temperature;

circulating the liquid coolant through the liquid coolant distribution loop;

receiving the liquid coolant from the liquid coolant distribution loop by a first port of each of the plurality of storage compartment cooling apparatuses;

circulating the liquid coolant through each of the plurality of storage compartment cooling apparatuses between the first port and a second port, comprising in each of the plurality of storage compartment cooling apparatuses:

circulating the liquid coolant through a heat exchanger disposed between the first port and the second port, thus transferring heat from an interior of a storage compartment of the storage compartment cooling apparatus into the liquid coolant to cool the interior of the storage compartment, and/or bypassing the liquid coolant around the heat exchanger;

outputting the liquid coolant to the liquid coolant distribution loop by the second port of each of the plurality of storage compartment cooling apparatuses;

controllably increasing and decreasing the flow of the liquid coolant through the heat exchanger;

arranging the plurality of storage compartment cooling apparatuses in one of two configurations:

1) in an in-parallel configuration, where each storage compartment cooling apparatus is in parallel flow with respect to the other storage compartment cooling apparatuses, or 2) in an in-series configuration, where each storage compartment cooling apparatus is in series flow with respect to the other storage compartment cooling apparatuses;

inputting a control signal into each storage compartment cooling apparatus' respective controller, the control signal configured to indicate whether the storage compartment cooling apparatuses are in the in-parallel configuration or the in-series configuration;

each respective controller programmed to execute the following control scheme in response to the control signal:

in the in-parallel liquid circulation configuration, controlling the one or more valves to substantially prevent the flow of the liquid coolant through the bypass line regardless of the flow of liquid coolant through the heat exchanger such that the total flow of liquid coolant from the first port to the second port is substantially equal to the flow of liquid coolant through the heat exchanger, and in the in-series liquid circulation configuration, proportionally controlling the one or more valves to increase and decrease the flow of the liquid coolant through the bypass line in reverse correspondence with the increase and decrease of the flow of the liquid coolant through the heat exchanger such that the total flow of liquid coolant from the first port to the second port is substantially constant while the flow of the liquid coolant through each of the bypass line and heat exchanger change.

13. The method of claim 12, wherein the plurality of storage compartment cooling apparatuses are coupled in series with the liquid coolant distribution loop, and the method further comprises:

determining whether a flow direction of the liquid coolant in the liquid coolant distribution loop should be reversed; and reversing the flow direction of the liquid coolant in the liquid coolant distribution loop from a forward flow direction to a reverse flow direction by a reversible flow unit when the determination is made to reverse the flow direction.

14. The method of claim 13, further comprising receiving temperature measurements from at least one of the plurality of storage compartment cooling apparatuses, and wherein the determination of whether the flow direction should be reversed is based on at least the temperature measurements.

15. The method of claim 13, wherein the determination of whether the flow direction should be reversed is based on at least a duration of time elapsed since the direction of flow was last reversed.

16. The method of claim 13, wherein a flow direction of liquid coolant through a heat exchanger that chills the liquid coolant does not reverse when the flow direction of the liquid coolant in the liquid coolant distribution loop reverses.

17. The method of claim 16, wherein reversing the flow direction comprises changing a state of a first two of four valves in the reversible flow unit from open to closed while changing a state of a second two of the four valves from closed to open, the four valves disposed in a circulation pattern to control a flow of the liquid coolant between the heat exchanger that chills the liquid coolant and the liquid coolant distribution loop.

18. The method of claim 12, further comprising in each of the plurality of storage compartment cooling apparatuses:

measuring a temperature associated with at least one of the storage compartment, the liquid coolant distribution loop, and an air circulation loop between the heat exchanger and the storage compartment using a temperature sensor, and controlling the one or more valves in response to the measurement of the temperature received from the temperature sensor.

19. The method of claim 12, further comprising in each of the plurality of storage compartment cooling apparatuses: circulating air in a loop between a liquid-to-air heat exchanger and the storage compartment using a fan.

20. The method claim 19, further comprising in each of the plurality of storage compartment cooling apparatuses: performing a defrost cycle by controlling the one or more valves to prevent the flow of liquid coolant through the heat exchanger while operating the fan to circulate air in the loop between the liquid-to-air heat exchanger and the storage compartment.

21. The method claim 19, wherein the fan is a centrifugal fan, the method further comprising in each of the plurality of storage compartment cooling apparatuses:

directing the air into contact with the liquid-to-air heat exchanger and through the fan using a duct, and causing the air to flow into the fan from a direction approximately parallel with an axis of rotation of the fan and output the air to a direction approximately perpendicular with the axis of rotation of the fan.

* * * * *